United States Patent
Tanaka

(10) Patent No.: US 6,678,753 B1
(45) Date of Patent: *Jan. 13, 2004

(54) IC CARD READING/WRITING APPARATUS AND METHOD FOR ALLOWING USE OF MULTIPLE VENDORS

(75) Inventor: Hiroshi Tanaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/661,391

(22) Filed: Sep. 13, 2000

Related U.S. Application Data

(62) Division of application No. 08/736,431, filed on Oct. 24, 1996, now Pat. No. 6,199,120.

(30) Foreign Application Priority Data

Dec. 20, 1995 (JP) .............................. 7-332421

(51) Int. Cl.⁷ .............................. G06F 9/06; G06F 9/24; G06F 12/06
(52) U.S. Cl. .............................. 710/16; 711/1; 711/2; 710/13; 710/11; 235/382; 235/380
(58) Field of Search .............................. 235/379, 380, 235/382; 710/16, 11, 13; 365/52; 711/1, 2

(56) References Cited

U.S. PATENT DOCUMENTS

| | | | |
|---|---|---|---|
| 4,742,351 A | | 5/1988 | Suzuki |
| 4,825,054 A | * | 4/1989 | Rust et al. ................... 235/380 |
| 4,847,803 A | * | 7/1989 | Miyano ....................... 235/382 |
| 4,916,662 A | * | 4/1990 | Mizuta ........................ 365/52 |
| 4,924,210 A | | 5/1990 | Matsui et al. |
| 4,926,347 A | * | 5/1990 | Uchida et al. ............... 395/112 |
| 4,942,534 A | | 7/1990 | Yokoyama et al. |
| 5,012,074 A | * | 4/1991 | Masada ....................... 235/379 |
| 5,070,233 A | * | 12/1991 | Takizawa et al. ........... 235/380 |
| 5,235,326 A | | 8/1993 | Beigel et al. |
| 5,332,889 A | * | 7/1994 | Lundstrom et al. .......... 235/380 |
| 5,383,147 A | * | 1/1995 | Sanemitsu .................... 365/52 |
| 5,410,690 A | | 4/1995 | Kawata |
| 5,436,862 A | | 7/1995 | Sanemitsu |
| 5,532,689 A | * | 7/1996 | Bueno ........................ 340/928 |
| 5,664,157 A | | 9/1997 | Takahira et al. |
| 5,798,507 A | * | 8/1998 | Kawagishi et al. .......... 235/380 |
| 5,799,171 A | * | 8/1998 | Kondou ....................... 703/27 |
| 6,199,120 B1 | * | 3/2001 | Tanaka ........................ 710/16 |
| 6,237,848 B1 | * | 5/2001 | Everett ....................... 235/380 |

FOREIGN PATENT DOCUMENTS

| | | |
|---|---|---|
| EP | 0 545 580 A2 | 6/1993 |
| EP | 0 744 708 A2 | 11/1996 |
| JP | 63-7057 | 1/1988 |
| JP | 63-250726 | 10/1988 |
| JP | 63-250789 | 10/1988 |
| JP | 1-105382 | 4/1989 |
| JP | 4-42383 | 2/1992 |
| JP | 5-40944 | 6/1993 |
| JP | 5-159118 | 6/1993 |
| JP | 6-119501 | 4/1994 |
| JP | 6-203227 | 7/1994 |
| JP | 6-302180 | 10/1994 |
| WO | WO 96/36934 | 11/1996 |

* cited by examiner

*Primary Examiner*—B. James Peikari
(74) *Attorney, Agent, or Firm*—Staas & Halsey LLP

(57) ABSTRACT

An IC card includes a card body, a memory section buried inside the card body and adapted to store data information and control information, and an interface section. The interface section inputs the data information to be stored in the memory section and outputs the data information stored in the memory section. The interface section also outputs the control information stored in the memory section. The memory section stores control information including card maker identification information to be reported to the outside. Therefore, it becomes possible to automatically identify the maker of each IC card, so that the IC card, the IC card reading/writing apparatus, etc., can be procured from multiple vendors when an IC card system is constructed.

3 Claims, 20 Drawing Sheets

— COMMAND CODE —— REQUEST MAKER IDENTIFIER
— COMMAND CLASS

— INFORMATION FOR SPECIFYING DATA (FILE NAME, RECORD NUMBER, etc.)
— COMMAND CODE
— COMMAND CLASS

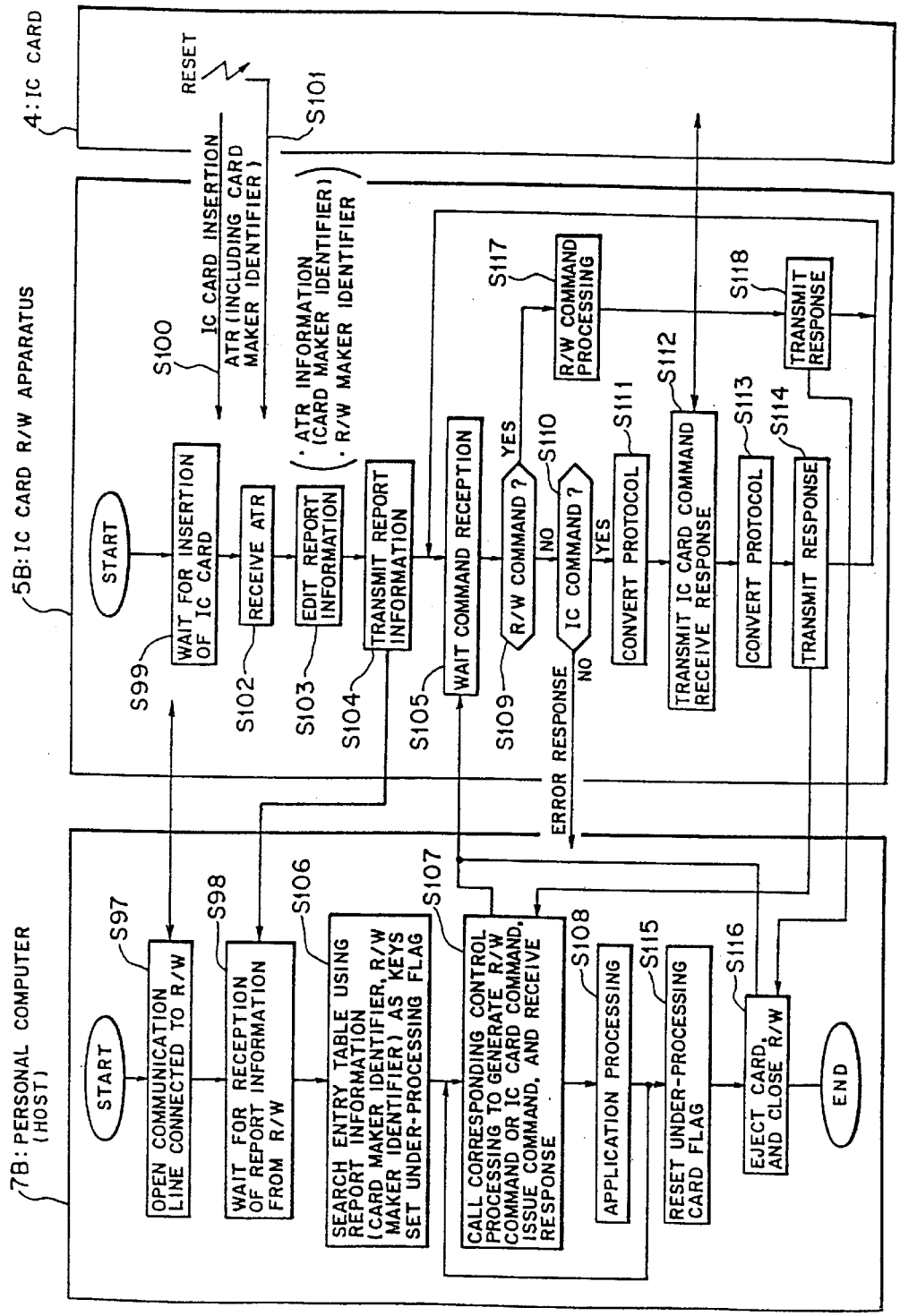

IC CARD READING/WRITING APPARATUS AND METHOD FOR ALLOWING USE OF MULTIPLE VENDORS

This application is a Divisional of application Ser. No. 08/736,431, filed Oct. 24, 1996, now issued as U.S. Pat. No. 6,199,120.

BACKGROUND OF THE INVENTION

(1) Field of the Invention

The present invention relates to an IC card, an IC card reading/writing apparatus, a host for an IC card reading/writing apparatus, an IC card system, and a method for allowing use of multiple vendors in an IC card system.

(2) Description of the Related Art

As is well known, various kinds of cards such as cash cards, credit cards, and consultation tickets for hospitals are presently used. So called magnetic cards are generally utilized as those cards. In this case, various kinds of data such as a code number recorded on a magnetic strip of each card are read out with a magnetic head.

However, a small memory capacity of such a magnetic card restricts expansion of the functions of the card. Furthermore, since data on the magnetic strip can be easily read out, there have been several problems in terms of security, such as forgery of cards, and unauthorized use of cards.

To solve these problems, research and development have been actively carried out on IC (Integrated Circuit) cards (smart cards), which are expected to eventually replace the above-mentioned magnetic cards. In each IC card, a microprocessor and a memory are included in the form of ICs. Such an IC card generally has a storage capacity of as large as about 16–64 kbits (corresponding to about 2000–8000 characters). In contrast, a magnetic card has a storage capacity of only about 80 characters. Furthermore, in an IC card, data erasure, data writing/updating, etc. can be performed repeatedly by a built-in microprocessor.

Accordingly, an IC card can record and manage a large amount of personal information, which has been impossible to record on a magnetic card due to its small storage capacity. For example, personal information such as a clinical record can be recorded into a consultation ticket (IC card) for hospital so as to manage the personal information.

A system utilizing such an IC card includes at least IC cards and a reading/writing (R/W) apparatus for performing data reading and data writing for the IC cards. When an IC card is inserted into the R/W apparatus, the R/W apparatus reads data recorded in the IC card and/or writes data into the IC card.

For such an IC card system, various improvements have been proposed, as disclosed in Japanese Patent Application Laid-Open Nos. HEI 1-105382 and HEI 5-159118. In the system disclosed in Japanese Patent Application Laid-Open No. HEI 1-105382, a memory into which identification codes such as a manufacturer code and a manufacturing lot code have been written is mounted on the IC card (memory card). When this IC card is installed in a computer system, the IC card allows an operator to determine the state of use of the memory ICs of the entire computer system. In the system disclosed in Japanese Patent Application No. HEI 5-159118, information regarding a manufacturer is displayed on the surface of an IC card using symbols, a photograph, or other image information so as to prevent forgery of the card and to make it possible to visually confirm the card.

When a user constructs a system utilizing IC cards, the user generally desires to purchase IC cards and R/W apparatuses from multiple vendors so as to reduce costs.

For the IC card system as described above, a protocol for transmission with IC cards, and commands for IC cards have been standardized by ISO (International Organization for Standardization). However, since detail portions have not been standardized, the specifications of IC cards supplied by different IC card makers differ slightly from each other, which makes it quite difficult to purchase IC cards from multiple vendors.

Similarly, R/W apparatuses supplied by different makers differ from each other in their R/W commands and transmission protocols. Therefore, at the stage of designing a system, makers from which IC cards and R/W apparatuses are purchased must be determined in advance before making application programs for a host such as a personal computer. This makes it quite difficult to purchase R/W apparatuses from multiple vendors.

Due to differences in processing within IC cards, IC cards supplied from different card makers slightly differ from one another in the length of the period from the point of time when an IC card is inserted into an R/W apparatus (or when hardware reset is performed) to the point of time when the R/W apparatus receives ATR (Answer To Reset) information which is reported from the IC card to the outside when the IC card is inserted. Generally, a method has been proposed in which the maker of each IC card is identified utilizing differences in the length of the above-mentioned period, thereby allowing use of multiple vendors in the system.

However, even in this system, when a certain IC card issues ATR information with the same timing as that of another IC card supplied by a different card maker, it becomes impossible to obtain correct information regarding the card maker of the certain card. Therefore, the above-described method is not a complete solution which makes it possible to construct a system in which all the makers of cards used in the system are specified so as to allow use of multiple vendors.

SUMMARY OF THE INVENTION

The present invention has been conceived to solve the foregoing drawbacks, and an object of the present invention is to provide an IC card, an IC card reading/writing apparatus, a host for an IC card reading/writing apparatus, an IC card system, and a method for allowing use of multiple vendors in an IC card system, in which the IC card is designed to have information for identifying the maker of the card while the IC card reading/writing apparatus is designed to have information for identifying the maker of the IC card reading/writing apparatus so as to make it possible to identify the maker of the IC card and the maker of the IC card reading/writing apparatus, thereby allowing procurement of the IC card, the IC card reading/writing apparatus, the host for the IC card reading/writing apparatus from multiple vendors.

To achieve the above object, the present invention provides an IC card which includes a card body, a memory section buried inside the card body and adapted to store data information and control information, and an interface section for inputting data information to be stored in the memory section and outputting the data information stored in the memory section and for outputting the control information stored in the memory section. The memory section stores control information including card maker identification information to be reported to the outside.

Accordingly, the IC card of the present invention can report to the outside the maker of the IC card for itself in accordance with the card maker identification information. Therefore, in the outside apparatus, the maker of the IC card can be recognized quite easily, so that processing suitable for the maker of the card can be performed at all times.

An IC card reading/writing apparatus according to the present invention includes an IC card reading/writing control section for controlling reading of data from an IC card and writing of data into the IC card. In order to communicate with a plurality of kinds of IC cards, the IC card reading/writing control section includes a plurality of IC card communication control sections, and a selecting section which receives card maker identification information reported by an IC card and selects an IC card communication control section corresponding to the IC card.

Accordingly, the IC card reading/writing apparatus of the present invention can perform reading/writing processing in a normal manner at all times for each of IC cards supplied by different makers.

Another IC card reading/writing apparatus according to the present invention includes an IC card reading/writing control section for controlling reading of data from an IC card and writing of data into the IC card. The IC card reading/writing control section includes a storage section for storing control information including apparatus maker identification information to be reported to a host.

Accordingly, the IC card reading/writing apparatus of the present invention allows the host to recognize an IC card reading/writing apparatus maker, which is always connected to the host, so as to perform communication control in a normal manner.

Still another IC card reading/writing apparatus according to the present invention includes an IC card reading/writing control section for controlling reading of data from an IC card and writing of data into the IC card. In order to communicate with a plurality of kinds of IC cards, the IC card reading/writing control section includes a plurality of IC card communication control sections, a selecting section which receives card maker identification information reported by an IC card and selects an IC card communication control section corresponding to the IC card, and a storage section for storing control information including apparatus maker identification information to be reported to a host.

Accordingly, the IC card reading/writing apparatus of the present invention can perform reading/writing processing in a normal manner at all times for each of IC cards supplied by different makers. Moreover, the IC card reading/writing apparatus of the present invention allows the host to recognize an IC card reading/writing apparatus maker, which is connected to the host, so as to perform communication control in a normal manner.

Still another IC card reading/writing apparatus according to the present invention includes an IC card reading/writing control section for controlling reading of data from an IC card and writing of data into the IC card. The IC card reading/writing control section includes a card maker identification information transfer section for receiving card maker identification information reported by an IC card so as to transfer the card maker identification information to a host.

Accordingly, in the IC card reading/writing apparatus of the present invention, the IC card reading/writing control section receives card maker identification information reported by an IC card and transfers the card maker identification information to the host. Therefore, the host can recognize at all time the maker of the IC card, so that communication control can be performed in a normal manner at all times for each of IC cards supplied by different makers.

Still another IC card reading/writing apparatus according to the present invention includes an IC card reading/writing control section for controlling reading of data from an IC card and writing of data into the IC card. The IC card reading/writing control section includes a storage section for storing control information including apparatus maker identification information to be reported to a host, and a card maker identification information transfer section for receiving card maker identification information reported by an IC card so as to transfer the card maker identification information to the host.

Accordingly, the IC card reading/writing apparatus of the present invention allows the host to identify both the maker of the IC card reading/writing apparatus and the maker of the IC card at all times. Therefore, communication with the IC card reading/writing apparatus and communication with the IC card can be controlled in a normal manner regardless of the makers of the IC card reading/writing apparatus and the IC card.

A host for an IC card reading/writing apparatus according to the present invention includes an IC card reading/writing apparatus control section which performs control for the IC card reading/writing apparatus. In order to communicate with a plurality of kinds of IC card reading/writing apparatuses, the IC card reading/writing apparatus control section includes a plurality of IC card reading/writing apparatus communication control sections, and a selecting section which receives apparatus maker identification information transferred from an IC card reading/writing apparatus and selects an IC card reading/writing apparatus communication control section corresponding to the IC card reading/writing apparatus.

Accordingly, the host for an IC card reading/writing apparatus of the present invention can perform communication control in a normal manner at all times regardless of the maker of the IC card reading/writing apparatus connected to the host.

Another host for an IC card reading/writing apparatus according to the present invention includes an IC card reading/writing apparatus control section which performs control for an IC card reading/writing apparatus. The IC card reading/writing apparatus control section additionally includes a plurality of IC card communication control sections, and a selecting section which receives card maker identification information transferred from an IC card reading/writing apparatus and selects an IC card communication control section corresponding to the IC card.

Accordingly, in the host for an IC card reading/writing apparatus of the present invention, the IC card reading/writing apparatus control section receives card maker identification information transferred from an IC card reading/writing apparatus and selects one of the plurality of IC card communication control sections, which corresponds to the IC card. Therefore, communication with a plurality of IC cards supplied from different card makers can be controlled in a normal manner at all times.

Still another host for an IC card reading/writing apparatus according to the present invention includes an IC card reading/writing apparatus control section which performs control for an IC card reading/writing apparatus. In order to communicate with a plurality of kinds of IC card reading/writing apparatuses, the IC card reading/writing apparatus control section includes a plurality of IC card reading/ writing apparatus communication control sections, a first selecting section which receives apparatus maker identification information transferred from the IC card reading/ writing apparatus and selects an IC card reading/writing apparatus communication control section corresponding to the IC card reading/writing apparatus, a plurality of IC card communication control sections, and a second selecting section which receives card maker identification information transferred from an IC card reading/writing apparatus and selects an IC card communication control section corresponding to the IC card.

Accordingly, the host for an-IC card reading/writing apparatus of the present invention can perform communication control in a normal manner at all times regardless of the makers of the IC card and the IC card reading/writing apparatus connected to the host.

An IC card system according to the present invention includes an IC card and an IC card reading/writing apparatus. The IC card includes a card body, a memory section buried inside the card body and adapted to store data information and control information, and an interface section for inputting the data information to be stored in the memory section and outputting the data information stored in the memory section and for outputting the control information stored in the memory section. The memory section stores control information including card maker identification information to be reported to the outside. The IC card reading/writing apparatus includes an IC card reading/ writing control section for controlling reading of data from an IC card and writing of data into the IC card. In order to control communication with a plurality of kinds of IC cards, the IC card reading/writing control section includes plurality of IC card communication control sections, and a selecting section which receives card maker identification information reported by an IC card and selects an IC card communication control section corresponding to the IC card.

A method for allowing use of multiple vendors in an IC card system according to the present invention is applicable to an IC card system which includes an IC card and an IC card reading/writing apparatus. In this method, card maker identification information is stored into the IC card in advance. Upon entry of the IC card into the IC card reading/writing apparatus, the card maker identification information is reported from the IC card to the IC card reading/writing apparatus in response to a trigger signal from the IC card reading/writing apparatus. Subsequently, in the IC card reading/writing apparatus, an IC card communication section corresponding to the IC card is selected based on the card maker identification information reported by the IC card so as to control communication with the IC card.

Accordingly, in the IC card system and in the method for allowing use of multiple vendors in an IC card system, communication control can be performed in a normal manner at all times regardless of the maker of the IC card. Therefore, when the system is constructed, the IC card can be procured from multiple vendors, thereby greatly reducing the procurement cost.

Another IC card system according to the present invention includes an IC card reading/writing apparatus and a host. The IC card reading/writing apparatus includes an IC card reading/writing control section for controlling reading of data from an IC card and writing of data into the IC card. The IC card reading/writing control section includes a storage section for storing control information including apparatus maker identification information to be reported to the host. The host includes an IC card reading/writing apparatus control section which performs control for the IC card reading/writing apparatus. In order to communicate with a plurality of kinds of IC card reading/writing apparatuses, the IC card reading/writing apparatus control section includes a plurality of IC card reading/writing apparatus communication control sections, and a selecting section which receives apparatus maker identification information transferred from an IC card reading/writing apparatus and selects an IC card reading/writing apparatus communication control section corresponding to the IC card reading/writing apparatus.

Another method for allowing use of multiple vendors in an IC card system according to the present invention is applicable to an IC card system which includes an IC card reading/writing apparatus and a host. In this method, apparatus maker identification information is stored into the IC card reading/writing apparatus in advance. When a communication line is connected between the IC card reading/ writing apparatus and the host, the apparatus maker identification information is reported from the IC card reading/ writing apparatus to the host. Subsequently, in the host, an IC card reading/writing apparatus communication section corresponding to the IC card reading/writing apparatus is selected based on the apparatus maker identification information transferred from the IC card reading/writing apparatus so as to control communication with the IC card reading/writing apparatus.

According to the IC card system and in the method for allowing use of multiple vendors in an IC card system according to the present invention, when the system is constructed, the IC card reading/writing apparatus can be procured from multiple vendors, thereby greatly reducing the procurement cost.

Still another IC card system according to the present invention includes an IC card, an IC card reading/writing apparatus, and a host. The IC card includes a card body, a memory section buried inside the card body and adapted to store data information and control information, and an interface section for inputting the data information to be stored in the memory section and outputting the data information stored in the memory section and for outputting the control information stored in the memory section. The memory section stores control information including card maker identification information to be reported to the outside. The IC card reading/writing apparatus includes an IC card reading/writing control section for controlling reading of data from an IC card and writing of data into the IC card. In order to control communication with a plurality of kinds of IC cards, the IC card reading/writing control section includes a plurality of IC card communication control sections, and a first selecting section which receives card maker identification information reported by an IC card and selects an IC card communication control section corresponding to the IC card, and a storage section for storing control information including apparatus maker identification information to be reported to the host. The host includes an IC card reading/writing apparatus control section which performs control for the IC card reading/writing apparatus. In order to control communication with a plurality of kinds of IC card reading/writing apparatuses, the IC card reading/ writing apparatus control section includes a plurality of IC card reading/writing apparatus communication control sections, and a second selecting section which receives apparatus maker identification information transferred from an IC card reading/writing apparatus and selects an IC card reading/writing apparatus communication control section corresponding to the IC card reading/writing apparatus.

Still another method for allowing use of multiple vendors in an IC card system according to the present invention is applicable to an IC card system which includes an IC card, an IC card reading/writing apparatus, and a host. In this method, card maker identification information is stored into the IC card in advance. Upon entry of the IC card into an IC card reading/writing apparatus, the card maker identification information is reported from the IC card to the IC card reading/writing apparatus in response to a trigger signal from the IC card reading/writing apparatus. Subsequently, in the IC card reading/writing apparatus, an IC card communication section corresponding to the IC card is selected based on the card maker identification information reported by the IC card so as to control communication with the IC card. Apparatus maker identification information is stored into the IC card reading/writing apparatus in advance. When a communication line is connected between the IC card reading/writing apparatus and the host, the apparatus maker identification information is reported from the IC card reading/writing apparatus to the host. Subsequently, in the host, an IC card reading/writing apparatus communication control section corresponding to the IC card reading/writing apparatus is selected based on the apparatus maker identification information transferred from the IC card reading/writing apparatus so as to control communication with the IC card reading/writing apparatus.

According to the IC card system and in the method for allowing use of multiple vendors in an IC card system according to the present invention, when the system is constructed, the IC card and the IC card reading/writing apparatus can be procured from multiple vendors, thereby greatly reducing the procurement cost.

Still another IC card system according to the present invention includes an IC card, an IC card reading/writing apparatus, and a host. The IC card includes a card body, a memory section buried inside the card body and adapted to store data information and control information, and an interface section for inputting data information to be stored in the memory section and outputting the data information stored in the memory section and for outputting the control information stored in the memory section. The memory section stores control information including card maker identification information to be reported to the outside. The IC card reading/writing apparatus includes an IC card reading/writing control section for controlling reading of data from an IC card and writing of data into the IC card. The IC card reading/writing control section includes a card maker identification information transfer section for receiving card maker identification information reported by an IC card so as to transfer the card maker identification information to the host. The host includes an IC card reading/writing apparatus control section which performs control for the IC card reading/writing apparatus. The IC card reading/writing apparatus control section includes a plurality of IC card communication control sections, and a selecting section which receives card maker identification information transferred from the IC card reading/writing apparatus and selects an IC card communication control section corresponding to the IC card.

Still another method for allowing use of multiple vendors in an IC card system according to the present invention is applicable to an IC card system which includes an IC card, an IC card reading/writing apparatus, and a host. In this method, card maker identification information is stored into the IC card in advance. Upon entry of the IC card into the IC card reading/writing apparatus, the card maker identification information is reported from the IC card to the IC card reading/writing apparatus in response to a trigger signal from the IC card reading/writing apparatus. Subsequently, in the IC card reading/writing apparatus, the card maker identification information is transferred to the host. In the host, an IC card communication section corresponding to the IC card is selected based on the card maker identification information transferred from the IC card reading/writing apparatus so as to control communication with the IC card.

Accordingly, in the IC card system and in the method for allowing use of multiple vendors in an IC card system, the structure of the IC card reading/writing apparatus can be simplified. In addition, since the IC card and the IC card reading/writing apparatus can be procured from multiple vendors, the procurement cost can be reduced.

Still another IC card system according to the present invention includes an IC card, an IC card reading/writing apparatus, and a host. The IC card includes a card body, a memory section buried inside the card body and adapted to store data information and control information, and an interface section for inputting data information to be stored in the memory section and outputting the data information stored in the memory section and for outputting the control information stored in the memory section. The memory section stores control information including card maker identification information to be reported to the outside. The IC card reading/writing apparatus includes an IC card reading/writing control section for controlling reading of data from an IC card and writing of data into the IC card. The IC card reading/writing control section includes a storage section for storing control information including apparatus maker identification information to be reported to the host, and a card maker identification information transfer section for receiving card maker identification information reported by an IC card so as to transfer the card maker identification information to the host. The host includes an IC-card reading/writing apparatus control section which performs control for the IC card reading/writing apparatus. In order to communicate with a plurality of kinds of IC card reading/writing apparatuses, the IC card reading/writing apparatus control section includes a plurality of IC card reading/writing apparatus communication control sections, a first selecting section which receives apparatus maker identification information transferred from an IC card reading/writing apparatus and selects an IC card reading/writing apparatus communication control section corresponding to the IC card reading/writing apparatus, a plurality of IC card communication control sections, and a second selecting section which receives card maker identification information transferred from the IC card reading/writing apparatus and selects an IC card communication control section corresponding to the IC card.

Still another method for allowing use of multiple vendors in an IC card system according to the present invention is applicable to an IC card system which includes an IC card, an IC card reading/writing apparatus, and a host. In this method, apparatus maker identification information is stored into the IC card reading/writing apparatus in advance. When a communication line is connected between the IC card reading/writing apparatus and the host, the apparatus maker identification information is reported from the IC card reading/writing apparatus to the host. Subsequently, in the host, an IC card reading/writing apparatus communication section corresponding to the IC card reading/writing apparatus is selected based on the apparatus maker identification information transferred from the IC card reading/writing apparatus so as to control communication with the IC card reading/writing apparatus. Card maker identification information is stored into the IC card in advance. Upon entry of the IC card into the IC card reading/writing apparatus, the card maker identification information is reported from the IC card to the IC card reading/writing apparatus in response to a trigger signal from the IC card reading/writing apparatus. Subsequently, in the IC card reading/writing apparatus, the card maker identification information notified from the IC card is transferred to the host. In the host, an IC card communication section corresponding to the IC card is selected based on the card maker identification information transferred from the IC card reading/writing apparatus so as to control communication with the IC card.

Accordingly, in the IC card system and in the method for allowing use of multiple vendors in an IC card system, the IC card and the IC card reading/writing apparatus can be procured from multiple vendors.

BRIEF DESCRIPTION OF THE DRAWINGS

FIG. 23 is a flowchart showing operation of the IC card system according to the third embodiment.

DESCRIPTION OF THE PREFERRED EMBODIMENTS (a) Aspects of the Present Invention Aspects of the present invention will first be described with reference to the accompanying drawings.

Figure 1:
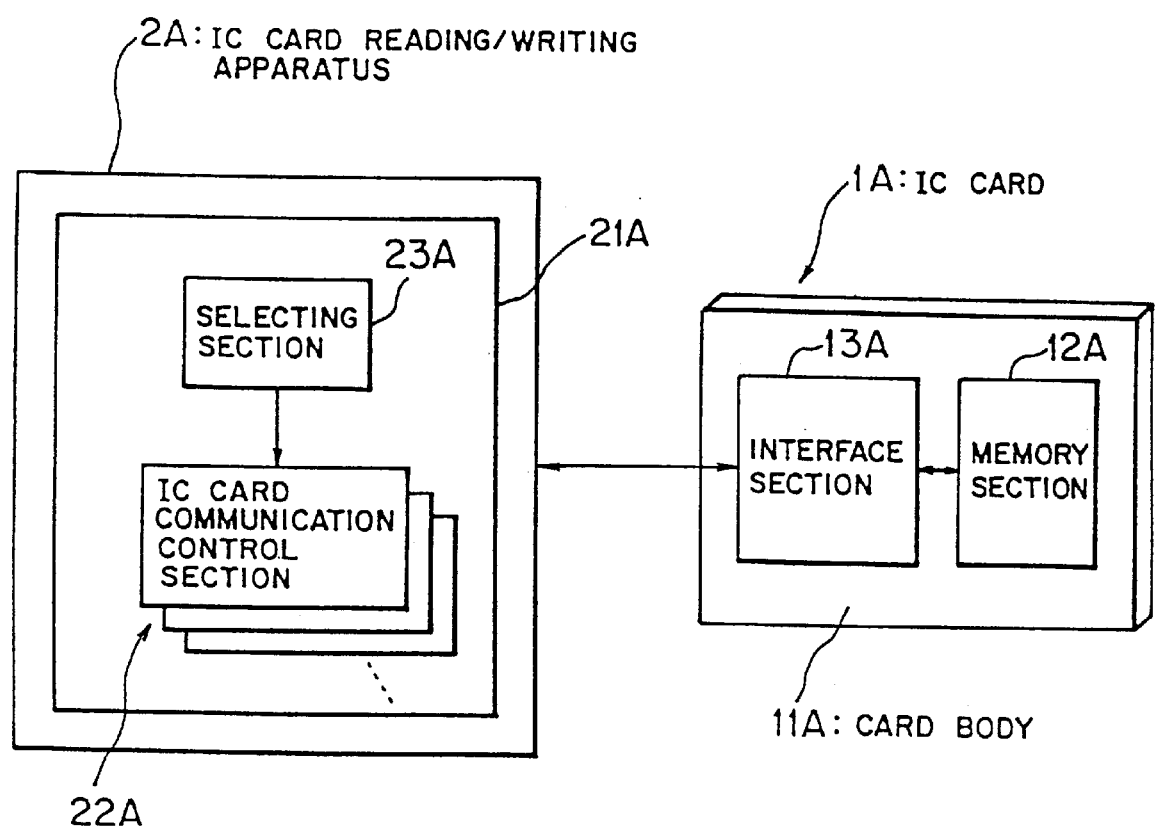
FIGS. 1, 2, 3, 4 and 5 are block diagrams each showing an aspect of the present invention.

FIG. 1 is a block diagram showing an aspect of the present invention. In FIG. 1, numeral 1A denotes an IC card, and numeral 2A denotes an IC card reading/writing apparatus. The IC card 1A and the IC card reading/writing apparatus 2A constitute an IC card system.

As shown in FIG. 1, the IC card 1A includes a card body 11A, a memory section 12A, and an interface section 13A. The IC card reading/writing apparatus 2A includes an IC card reading/writing control section 21A.

The memory section 12A of the IC card 1A is buried within the card body 11A and is adapted to store data information and control information. In this case, the memory section 12A stores control information including card maker identification information to be reported to the outside. The interface section 13A inputs data information to be stored in the memory section 12A and outputs the data information stored in the memory section 12A, and also outputs the control information stored in the memory section 12A.

In the above-described IC card 1A, since the memory section 12A stores control information including card maker identification information to be reported to the outside, the IC card 1A can report its maker to the outside by using the card maker identification information. Therefore, in an outside apparatus, the maker of the IC card 1A can be identified quite easily, so that processing suitable for the maker of the card can be performed at all times.

The IC card reading/writing control section 21A of the IC card reading/writing apparatus 2A controls reading of data from an IC card 1A and writing of data into the IC card 1A. In order to communicate with a plurality of kinds of IC cards 1A, the IC card reading/writing control section 21A includes a plurality of IC card communication control sections 22A, and a selecting section 23A which receives card maker identification information reported by the IC card 1A and selects an IC card communication control section 22A corresponding to the IC card 1A.

Accordingly, in the above-described IC card reading/writing apparatus 2A, since the IC card reading/writing control section 21A receives the card maker identification information reported by the IC card 1A and selects one of the IC card communication control sections 22A corresponding to the IC card 1A, communication with a plurality of kinds of IC cards 1A can be controlled. Therefore, it is possible for the IC card reading/writing apparatus 2A to perform reading/writing processing for the IC card 1A in a normal manner at all times.

That is, the IC card system shown in FIG. 1 is constructed by combining the IC card 1A and the IC card reading/writing apparatus 2A. Specifically, the above-described card maker identification information is included into the control information for response which is reported, as a response, to the outside upon reception of a command. This allows the outside apparatus, which has received the information, to identify the maker of the IC card 1A.

When the above-described card maker identification information is included into answer-to-reset information which is reported to the outside when a hardware reset is carried out, the card maker identification information is reported to the outside simultaneously with the hardware reset of the IC card 1A. This allows the outside apparatus to securely identify the maker of the IC card 1A before starting processing.

Moreover, the card maker identification information may be included in control information provided separately. By reporting this control information to the outside, the maker of the IC card 1A can be identified reliably.

In the IC card system having the above-described structure, the card maker identification information is stored into an IC card 1A in advance. Upon entry of the IC card 1A into the IC card reading/writing apparatus 2A, the card maker identification information is reported by the IC card 1A to the IC card reading/writing apparatus 2A in response to a trigger signal from the IC card reading/writing apparatus 2A. Subsequently, in the IC card reading/writing apparatus 2A, an IC card communication section 22A corresponding to the IC card 1A is selected based on the card maker identification information reported by the IC card 1A so as to control communication with the IC card 1A.

Accordingly, in the above-described IC card system and in the above-described method for allowing use of multiple vendors in an IC card system, communication control can be performed in a normal manner at all times regardless of the maker of the IC card 1A. Therefore, when the system is constructed, the IC card 1A can be procured from multiple vendors, thereby greatly reducing the procurement cost.

Specifically, upon entry of the IC card 1A into the IC card reading/writing apparatus 2A, answer-to-reset information including the card maker identification information is reported by the IC card 1A to the IC card reading/writing apparatus 2A in response to a hardware reset signal from the IC card reading/writing apparatus 2A.

Accordingly, the IC card reading/writing apparatus 2A can perform communication with the IC card 1A in a normal manner after securely recognizing the inserted IC card 1A.

Figure 2:
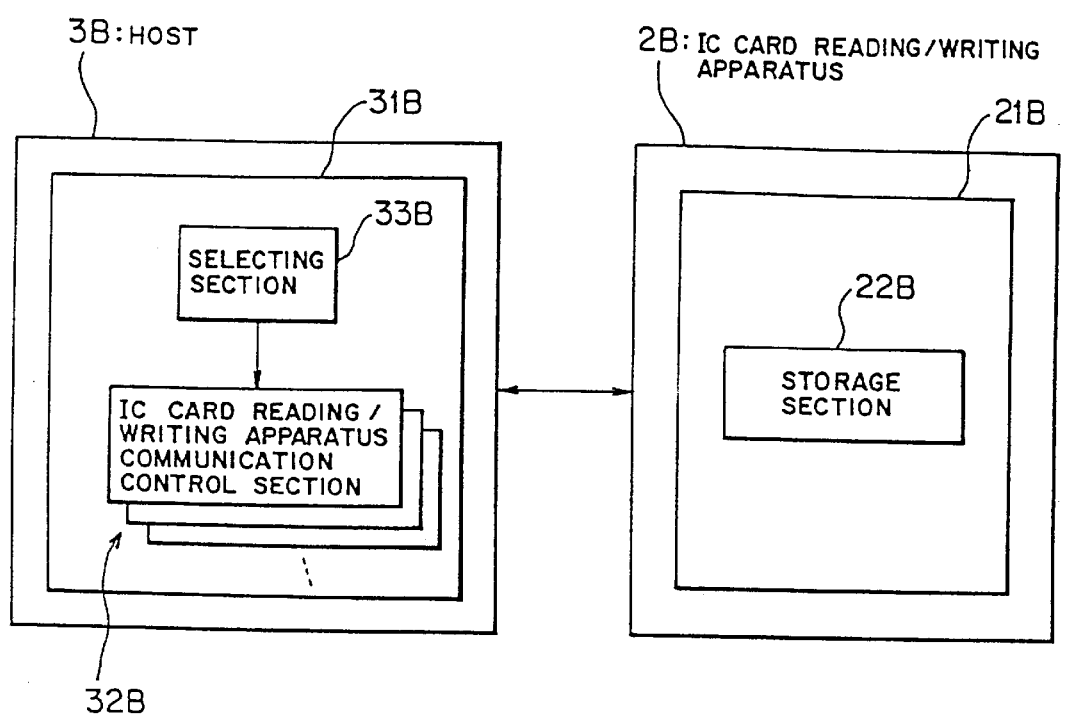

FIG. 2 shows another aspect of the present invention. The IC card system shown in FIG. 2 includes an IC card reading/writing apparatus 2B, and a host 3B for the IC card reading/writing apparatus 2B. The IC card reading/writing apparatus 2B includes an IC card reading/writing control section 21B. The host 3B includes an IC card reading/writing apparatus control section 31B.

In the IC card reading/writing apparatus 2B, the IC card reading/writing control section 21B controls reading and writing operation for the IC card. The IC card reading/writing control section 21B includes a storage section 22B which stores control information including apparatus maker identification information to be reported to the host 3B.

In the above-described IC card reading/writing apparatus 2B, since the IC card reading/writing control section 21B can report control information including apparatus maker identification information to the host 3B, the host 3B can receive the apparatus maker identification information and identify the maker of the IC card reading/writing apparatus 2B, which is always connected to the host 3B, so as to perform communication control in a normal manner.

In the host 3B, the IC card reading/writing apparatus control section 31B controls the IC card reading/writing apparatus 2B. As shown in FIG. 2, in order to perform communication with a plurality of kinds of IC card reading/writing apparatus 2B, the IC card reading/writing apparatus control section 31B includes a plurality of IC card reading/writing apparatus communication control sections 32B, and a selecting section 33B which receives apparatus maker identification information transferred from the IC card reading/writing apparatus 2B and selects an IC card reading/writing apparatus communication control section 32B corresponding to the IC card reading/writing apparatus 2B.

In the above-described host 3B for an IC card reading/writing apparatus, since the IC card reading/writing apparatus control section 31B receives apparatus maker identification information transferred from the IC card reading/writing apparatus 2B and selects one of the plurality of IC card reading/writing apparatus communication control sections 32B corresponding to the IC card reading/writing-apparatus 2B so as to control communication with the plurality of kinds of the IC card reading/writing apparatuses 2B. Accordingly, the host 3B for an IC card reading/writing apparatus can perform communication control in a normal manner at all times regardless of the maker of the IC card reading/writing apparatus 2B connected to the host 3B.

In the IC card system having the above-described structure, apparatus maker identification information is stored into the IC card reading/writing apparatus 2B in advance. When a communication line is connected between the IC card reading/writing apparatus 2B and the host 3B, the apparatus maker identification information is transferred from the IC card reading/writing apparatus 2B to the host 3B. Subsequently, in the host 3B, an IC card reading/writing apparatus communication control section 32B corresponding to the IC card reading/writing apparatus 2B is selected based on the apparatus maker identification information transferred from the IC card reading/writing apparatus 2B so as to control communication with the IC card reading/writing apparatus 2B.

Accordingly, when the system is constructed, the IC card reading/writing apparatus 2B can be procured from multiple vendors, thereby greatly reducing the procurement cost.

Specifically, when a communication line is connected between the IC card reading/writing apparatus 2B and the host 3B and the system is then started up, the apparatus maker identification information is transferred from the IC card reading/writing apparatus 2B to the host 3B. This allows the host 3B to recognize the maker of the IC card reading/writing apparatus 2B which is connected to the host 3B and to normally perform communication with the host 3B.

Figure 3:
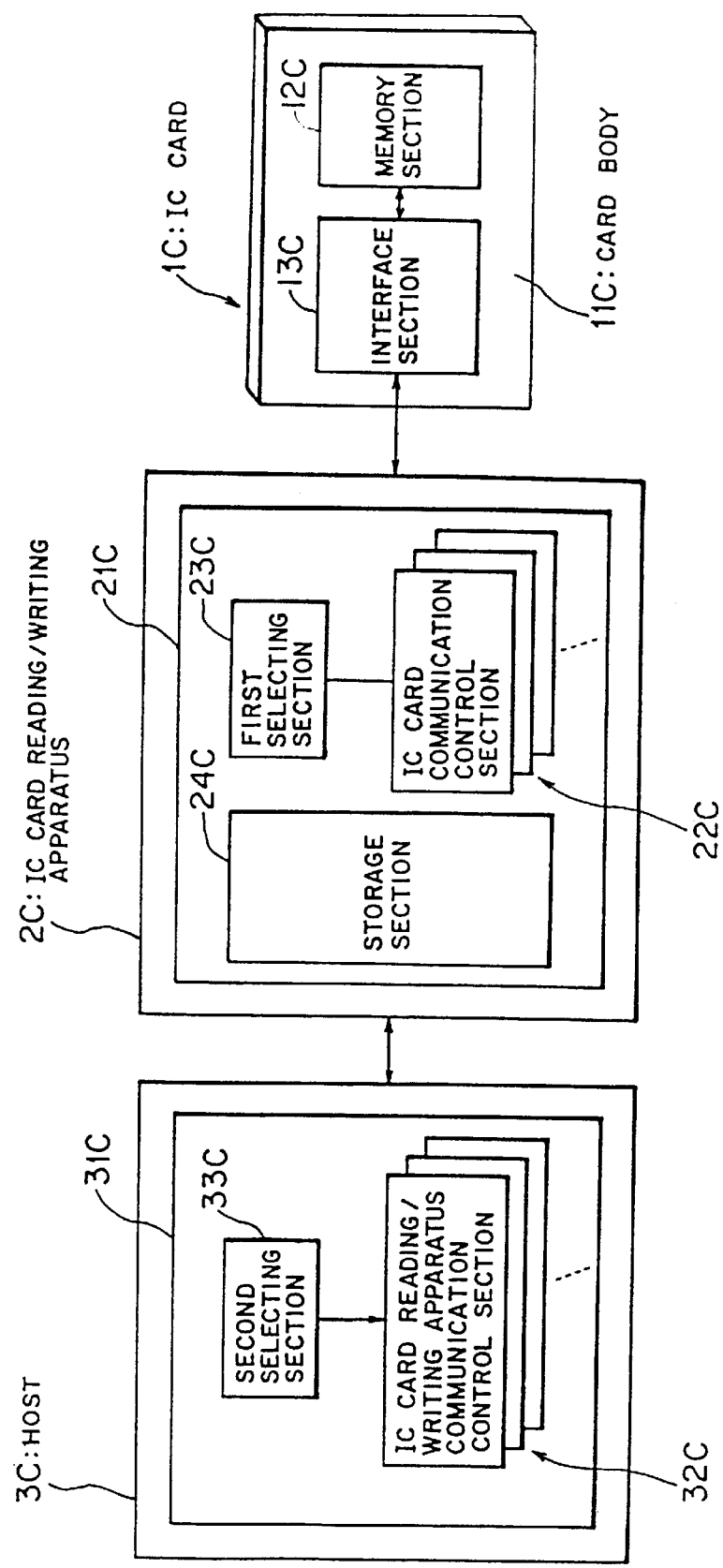

FIG. 3 shows another aspect of the present invention. The IC card system shown in FIG. 3 includes an IC card 1C, an IC card reading/writing apparatus 2C, and a host 3C. In this case also, the IC card 1C includes a card body 1C, a memory section 12C which is buried within the card body 11C and is adapted to store data information and control information, and an interface section 13C which inputs data information to be stored in the memory section 12C and outputs the data information stored in the memory section 12C, and also outputs the control information stored in the memory section 12C. The memory section 12C stores control information including card maker identification information to be reported to the outside.

The IC card reading/writing apparatus 2C includes an IC card reading/writing control section 21C for controlling reading of data from an IC card 1C and writing of data into the IC card 1C. In order to control communication with a plurality of kinds of IC cards 1C, the IC card reading/writing control section 21C includes a plurality of IC card communication control sections 22C, and a first selecting section 23C which receives card maker identification information reported by the IC card 1C and selects an IC card communication control section 22C corresponding to the IC card 1C. The IC card reading/writing control section 21C further comprises a storage section for storing control information including apparatus maker identification information to be reported to the host 3C.

Moreover, the host 3C includes an IC card reading/writing apparatus control section 31C for performing control for the IC card reading/writing apparatus 2C. In order to control communication with a plurality of kinds of IC card reading/writing apparatuses 2C, the IC card reading/writing apparatus control section 31C includes a plurality of IC card reading/writing apparatus communication control sections 32C, and a second selecting section 33C which receives apparatus maker identification information transferred from the IC card reading/writing apparatus 2C and selects an IC card reading/writing apparatus communication control section 32C corresponding to the IC card reading/writing apparatus 2C.

Therefore, in the above-described IC card reading/writing apparatus 2C, the IC card reading/writing control section 21C receives the card maker identification information reported by the IC card 1C and selects one of the IC card communication control sections 22C corresponding to the IC card 1C so as to control communication with a plurality of kinds of IC cards 1C. Moreover, the IC card reading/writing control section 21C reports control information including apparatus maker identification information to the host 3C. Therefore, it is possible to perform reading/writing processing for the IC card 1C in a normal manner at all times. In addition, the host 3C can recognize the maker of the IC card reading/writing apparatus 2C connected to the host 3C so as to perform communication control in a normal manner.

In this case as well, the above-described card maker identification information stored in the memory section 12C of the IC card 1C is included into the control information for response which is reported, as a response, to the outside upon reception of a command. Specifically, the above-described card maker identification information may be included into answer-to-reset information which is reported to the outside when a hardware reset is carried out. Alternatively, the above-described card maker identification information may be included into specially provided control information as information to be reported to the outside.

In the IC card system having the above-described structure, the card maker identification information is stored into an IC card 1C in advance. Upon entry of the IC card 1C into the IC card reading/writing apparatus 2C, the card maker identification information is reported by the IC card 1C to the IC card reading/writing apparatus 2C in response to a trigger signal from the IC card reading/writing apparatus 2C. Subsequently, in the IC card reading/writing apparatus 2C, an IC card communication control section 22C corresponding to the IC card 1C is selected based on the card maker identification information reported by the IC card 1C so as to control communication with the IC card 1C.

Also, apparatus maker identification information is included into the IC card reading/writing apparatus 2C in advance. When a communication line is connected between the IC card reading/writing apparatus 2C and the host 3C, the apparatus maker identification information is transferred from the IC card reading/writing apparatus 2C to the host 3C. Subsequently, in the upper-level apparatus 3C, an IC card reading/writing apparatus communication control section 32C corresponding to the IC card reading/writing apparatus 2C is selected based on the apparatus maker identification information transferred from the IC card reading/writing apparatus 2C so as to control communication with the IC card reading/writing apparatus 2C.

Accordingly, the IC card reading/writing apparatus 2C can perform communication control in a normal manner at all times regardless of the maker of the IC card 1C. In addition, the host 3C can perform communication control in a normal manner at all times regardless of the maker of the IC card reading/writing apparatus 2C connected to the host 3C. Therefore, when the system is constructed, the IC card 1C and the IC card reading/writing apparatus 2C can be procured from multiple vendors, thereby greatly reducing the procurement cost.

Specifically, in this case as well, upon entry of the IC card 1C into the IC card reading/writing apparatus 2C, answer-to-reset information including the card maker identification information is reported by the IC card 1C to the IC card reading/writing apparatus 2C in response to a hardware reset signal from the IC card reading/writing apparatus 2C.

Figure 4:
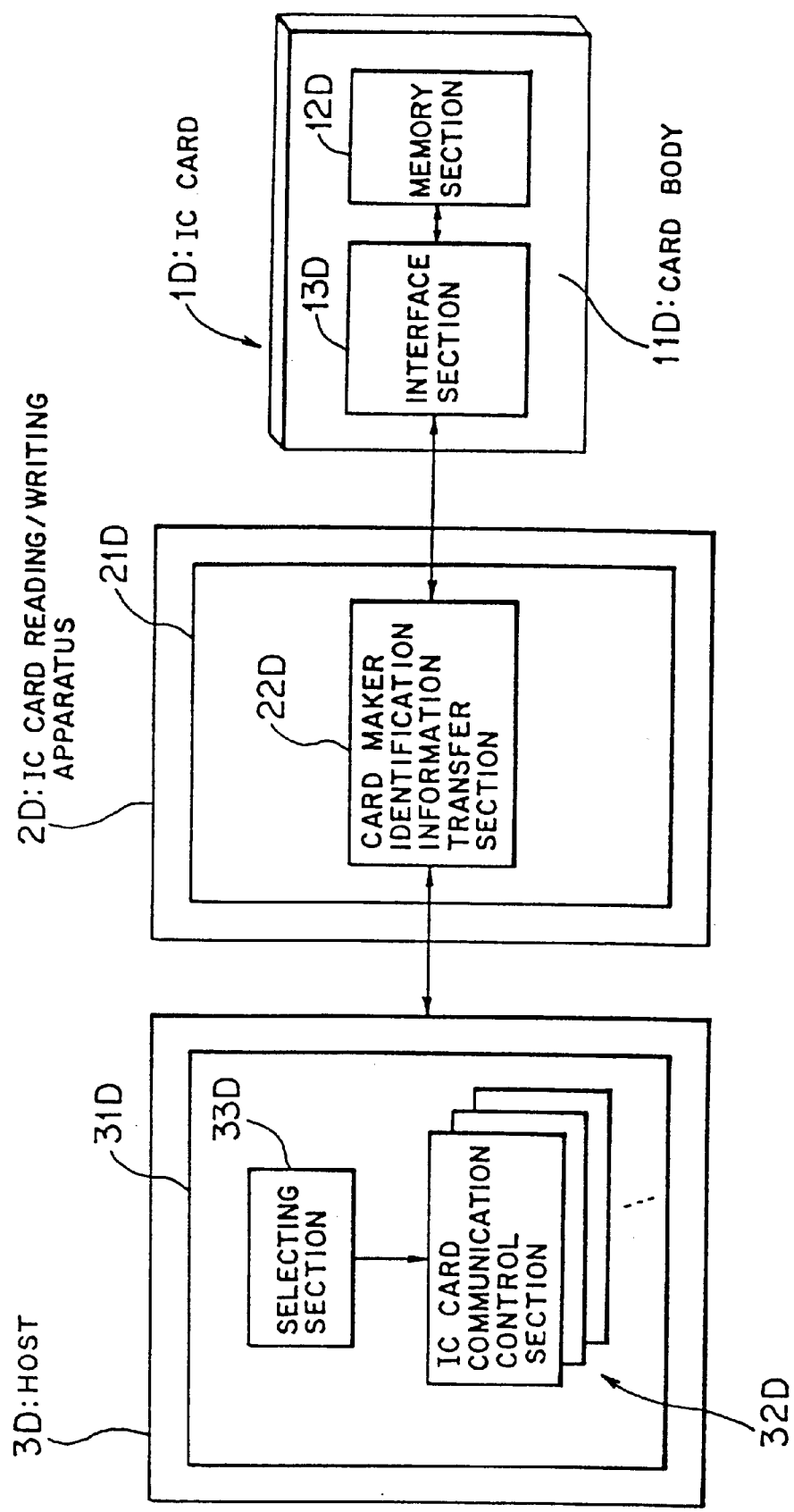

FIG. 4 shows another aspect of the present invention. The IC card system shown in FIG. 4 includes an IC card 1D, an IC card reading/writing apparatus 2D, and a host 3D for the IC card reading/writing apparatus 2D. The IC card iD includes a card body 11D, a memory section 12D which is buried within the card body 11D and is adapted to store data information and control information, and an interface section 13D which inputs data information to be stored in the memory section 12D and outputs the data information stored in the memory section 12D, and also outputs the control information stored in the memory section 12D. The memory section 12D stores control information including card maker identification information to be reported to the outside.

The IC card reading/writing apparatus 2D includes an IC card reading/writing control section 21D for controlling reading of data from an IC card 1D and writing of data into the IC card 1D. The 1D card reading/writing control section 21D includes a card maker identification information transfer section 22D for receiving card maker identification information reported by the IC card 1D so as to transfer the card maker identification information to the host 3D.

In the IC card reading/writing apparatus 2D having the above-described structure, the IC card reading/writing control section 21D receives card maker identification information reported by the IC card 1D and transfers the card maker identification information to the host 3D. Therefore, the host 3D can identify the maker of the IC card 1D at all times, so that communication control can be performed in a normal manner at all times regardless of the maker of the IC card 1D.

Moreover, the host 3D includes an IC card reading/writing apparatus control section 31D for performing control for the IC card reading/writing apparatus 2D. In the IC card reading/writing apparatus control section 31D, there are added a plurality of IC card communication control sections 32D, and a selecting section 33D which receives card maker identification information transferred from the IC card reading/writing apparatus 2D and selects an IC card communication control section 32D corresponding to the IC card 1D.

Therefore, in the above-described host 3D for an IC card reading/writing apparatus, the IC card reading/writing apparatus control section 31D receives the card maker identification information transferred from the IC card reading/writing apparatus 2D and selects one of the IC card communication control sections 32D corresponding to the IC card 1D. This makes it possible to control communication with a plurality of kinds of IC cards 1D of different makers in a normal manner at all times.

In this case as well, the above-described card maker identification information stored in the memory section 12D of the IC card 1D is included into the control information for response which is reported, as a response, to the outside upon reception of a command. Specifically, the above-described card maker identification information may be included into answer-to-reset information which is reported to the outside when a hardware reset is carried out, or may be included into control information which is prepared separately.

In the IC card system having the above-described structure, the card maker identification information is stored into an IC card 1D in advance. Upon entry of the IC card 1D into the IC card reading/writing apparatus 2D, the card maker identification information is reported by the IC card 1D to the IC card reading/writing apparatus 2D in response to a trigger signal from the IC card reading/writing apparatus 2D. Subsequently, in the IC card reading/writing apparatus 2D, the card maker identification information reported by the IC card 1D is transferred to the host 3D. In the host 3D, an IC card communication control section 32D corresponding to the IC card 1D is selected based on the card maker identification information transferred from the IC card reading/writing apparatus 2D so as to control communication with the IC card 1D.

Accordingly, the host 3D can perform communication control in a normal manner at all times regardless of the makers of the IC card 1D and the IC card reading/writing apparatus 2D. Therefore, it is possible not only to simplify the structure of the IC card reading/writing apparatus 2D, and but also to procure the IC card 1D, the IC card reading/writing apparatus 2D and the host 3D from multiple vendors, thereby greatly reducing the procurement cost.

Specifically, in this case as well, upon entry of the IC card 1D into the IC card reading/writing apparatus 2D, answer-to-reset information including the card maker identification information is reported by the IC card 1D to the IC card reading/writing apparatus 2D in response to a hardware reset signal from the IC card reading/writing apparatus 2D.

Figure 5:
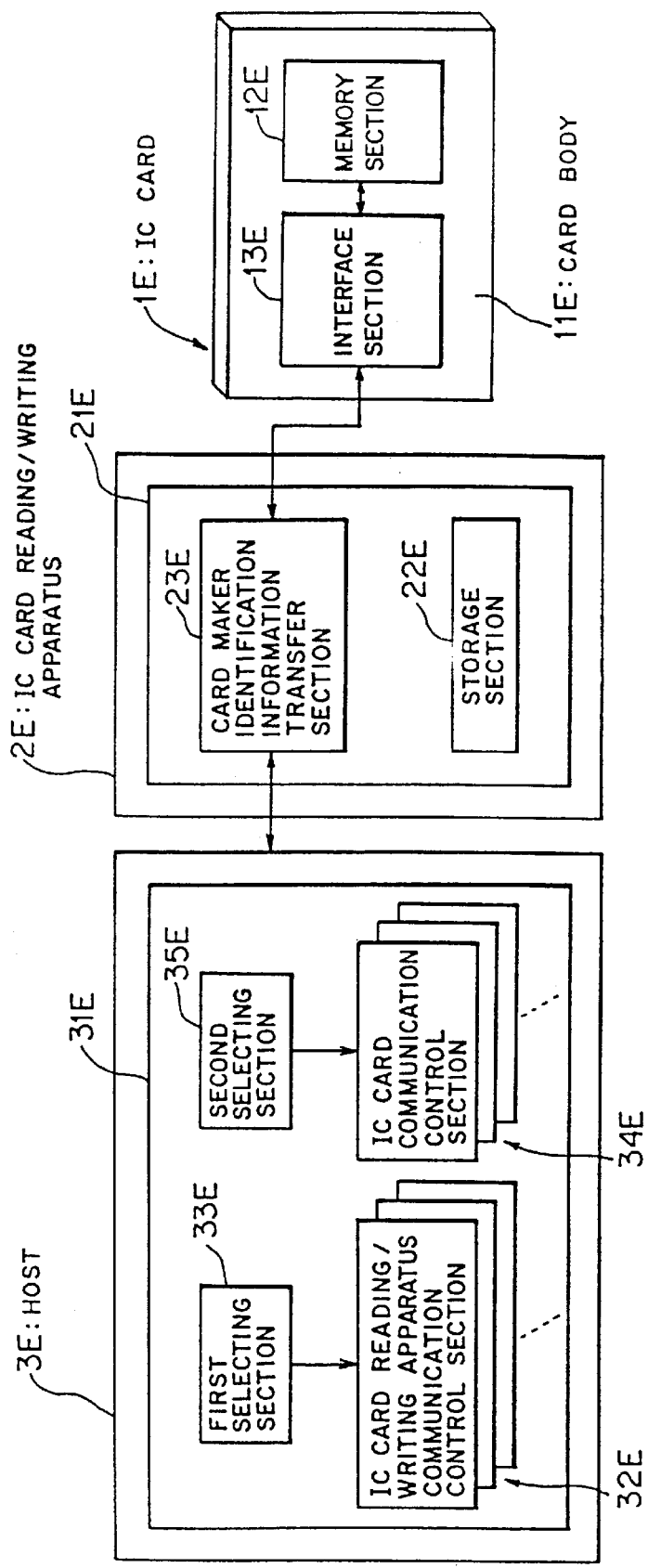

FIG. 5 shows another aspect of the present invention. The IC card system shown in FIG. 5 includes an IC card 1E, an IC card reading/writing apparatus 2E, and a host 3E for an IC card reading/writing apparatus 2E. In this case as well, the IC card 1E includes a card body 11E, a memory section 12E which is buried within the card body 11E and is adapted to store data information and control information, and an interface section 13E which inputs data information to be stored in the memory section 12E and outputs the data information stored in the memory section 12E, and also outputs the control information stored in the memory section 12E. The memory section 12E stores control information including card maker identification information to be reported to the outside.

The IC card reading/writing apparatus 2E includes an IC card reading/writing control section 21E for controlling reading of data from an IC card 1E and writing of data into the IC card 1E. The IC card reading/writing control section 21E includes a storage section 22E which stores control information including apparatus maker identification information to be reported to the host 3E. Moreover, the IC card reading/writing control section 21E includes a card maker identification information transfer section 23E for receiving card maker identification information reported by the IC card 1E so as to transfer the card maker identification information to the host 3E.

In the above-described IC card reading/writing apparatus 2E, the IC card reading/writing control section 21E reports control information including apparatus maker identification information to the host 3E, and receives card maker identification information reported by the IC card 1E so as to transfer the card maker identification information to the host 3E. Therefore, the host 3E can recognize both the maker of the IC card 1E and the maker of the IC card reading/writing apparatus 2E at all times, so that communication with the IC card reading/writing apparatus 2E and communication with the IC card 1E can be controlled in a normal manner at all times regardless of the makers of the IC card 1E and the IC card reading/writing apparatus 2E.

Moreover, the host 3E includes an IC card reading/writing apparatus control section 31E for performing control for the IC card reading/writing apparatus 2E. In order to control communication with a plurality of kinds of IC card reading/writing apparatus 2E, the IC card reading/writing apparatus control section 31E includes a plurality of IC card reading/writing apparatus communication control sections 32E, a first selecting section 33E which receives apparatus maker identification information reported by the IC card reading/writing apparatus 2E and selects an IC card reading/writing apparatus communication control section 32E corresponding to the IC card reading/writing apparatus 2E. In the IC card reading/writing apparatus communication control sections 32E, there are additionally provided a plurality of IC card communication control sections 34E, and a second selecting section 35E which receives card maker identification information transferred from the IC card reading/writing apparatus 2E and selects one of the IC card communication control sections 32E corresponding to the IC card 1E.

Therefore, in the above-described host 3E for an IC card reading/writing apparatus, the IC card reading/writing apparatus control section 31E receives the apparatus maker identification information transferred from the IC card reading/writing apparatus 2E and selects one of the IC card reading/writing apparatus communication control sections 32E corresponding to the IC card reading/writing apparatus 2E, so that communication with a plurality kinds of IC card reading/writing apparatuses 2E can be controlled. Moreover, the IC card reading/writing apparatus control section 31E receives the card maker identification information transferred from the IC card reading/writing apparatus 2E and selects one of the IC card communication control sections 34E corresponding to the IC card 1E, so that communication with a plurality kinds of IC cards 1E can be controlled. Accordingly, it is possible to perform communication control in a normal manner at all times regardless of the makers of the IC card 1E and the reading/writing apparatus 2E connected to the host 3E.

In the IC card system having the above-described structure, apparatus maker identification information is stored into the IC card reading/writing apparatus 2E in advance. When a communication line is connected between the IC card reading/writing apparatus 2E and the host 3E, the apparatus maker identification information is transferred from the IC card reading/writing apparatus 2E to the host 3E. Subsequently, in the host 3E, an IC card reading/writing apparatus communication control section 32E corresponding to the IC card reading/writing apparatus 2E is selected based on the apparatus maker identification information transferred from the IC card reading/writing apparatus 2E so as to control communication with the IC card reading/writing apparatus 2E.

Moreover, the card maker identification information is stored into the IC card 1E in advance. Upon entry of the IC card 1E into the IC card reading/writing apparatus 2E, the card maker identification information is reported by the IC card 1E to the IC card reading/writing apparatus 2E in response to a trigger signal from the IC card reading/writing apparatus 2E. Subsequently, in the IC card reading/writing apparatus 2E, the card maker identification information reported-by the IC card 1E is transferred to the host 3E. In the host 3E, an IC card communication control section 34E corresponding to the IC card 1E is selected based on the card maker identification information transferred from the IC card reading/writing apparatus 2E so as to control communication with the IC card 1E.

Accordingly, the host 3E can perform communication control in a normal manner at all times regardless of the makers of the IC card 1E and the IC card reading/writing apparatus 2E. Therefore, in this case also, the IC cards 1E and the IC card reading/writing apparatus 2E can be procured from multiple vendors.

Specifically, in this case as well, upon entry of the IC card 1E into the IC card readinq/writing apparatus 2E, answer-to-reset information including the card maker identification information is reported by the IC card 1E to the IC card reading/writing apparatus 2E in response to a hardware reset signal from the IC card reading/writing apparatus 2E.

The IC card reading/writing apparatus 2A–2E may have a structure such that the IC card reading/writing control section 21A–21E controls reading/writing operation for the IC card 1A, 1C–1E based on control information from the host 3B–3E. Moreover, the IC card reading/writing apparatus 2A–2E may have a structure such that the reading/writing operation for the IC card 1A, 1C–1E is controlled by the application section provided in the IC card reading/writing apparatus 2A–2E. This greatly contributes to flexibility in manufacture of the IC card reading/writing apparatus 2A–2E.

(b) First Embodiment of the Invention

A first embodiment of the present invention will now be described with reference to the drawings.

Figure 6:
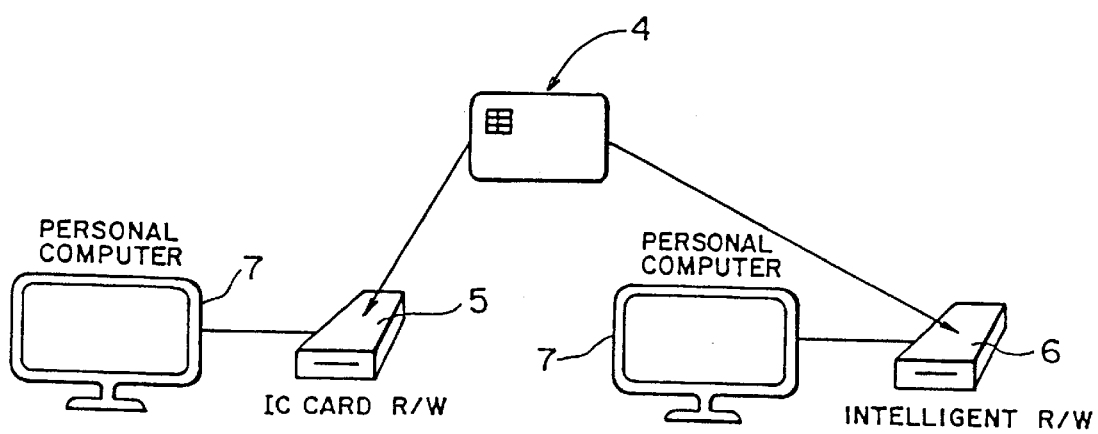
FIG. 6 is a block diagram showing an-example of an IC card system according to a first embodiment of the present invention.

FIG. 6 shows an example of an IC card system according to a first embodiment of the present invention. In FIG. 6, numeral 4 denotes an IC card, numeral 5 denotes an IC card reading/writing apparatus (IC card R/W apparatus), numeral 6 denotes an intelligent type IC card R/W apparatus, and numeral 7 denotes a personal computer which is connected to the IC card R/W apparatus 5 or 6 as a host.

Figure 7:
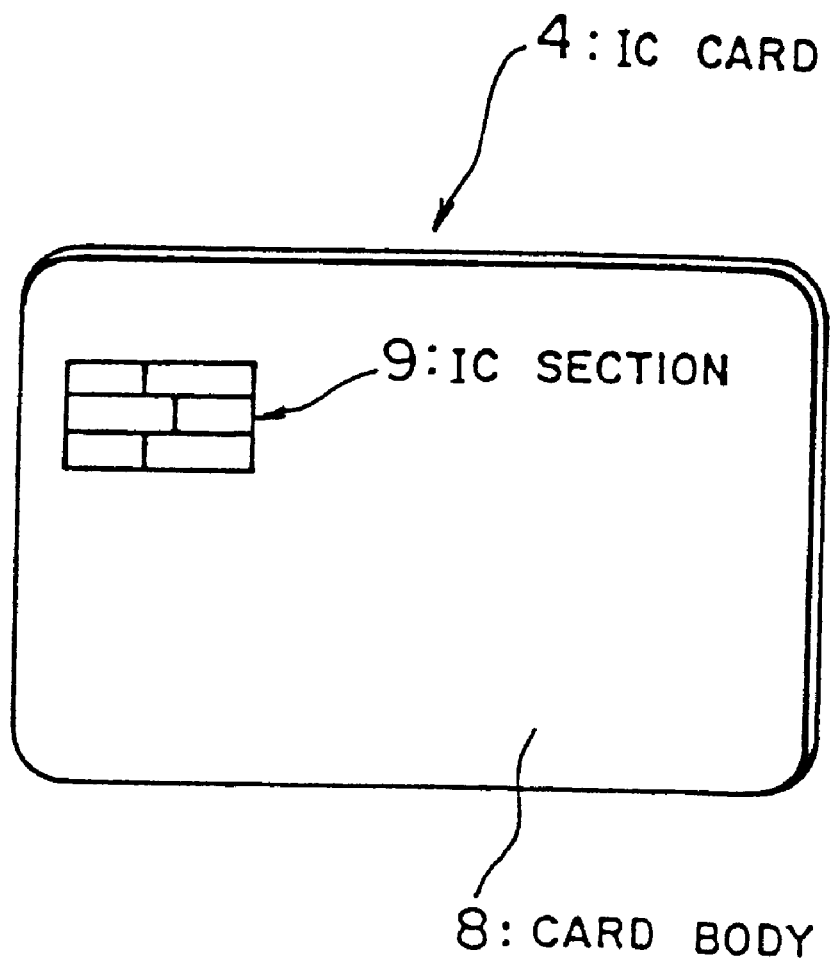
FIG. 7 is a view showing an example of the appearance of an IC card according to the first embodiment.

As shown in FIG. 7, for example, the IC card 4 has such a structure that an IC section (integrated circuit section) 9 having a calculation function provided by a microprocessor or the like and a storage function provided by a memory or the like is built (buried) within a card body 8. Data in the memory can be rewritten and erased repeatedly by the built-in microprocessor.

Figure 8:
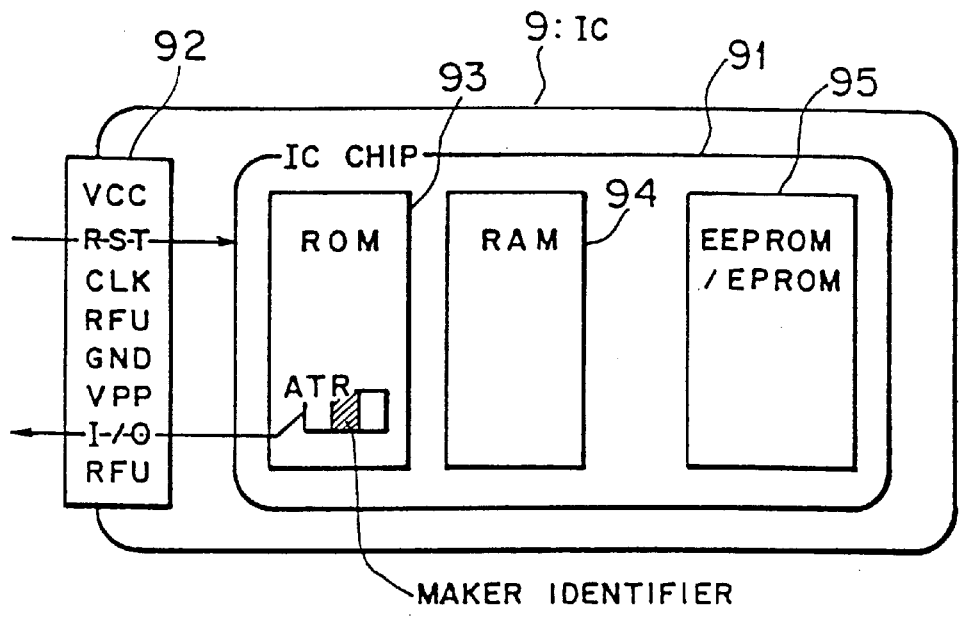
FIG. 8 is a block diagram showing a structure of the IC card according to the first embodiment.
Figure 9:
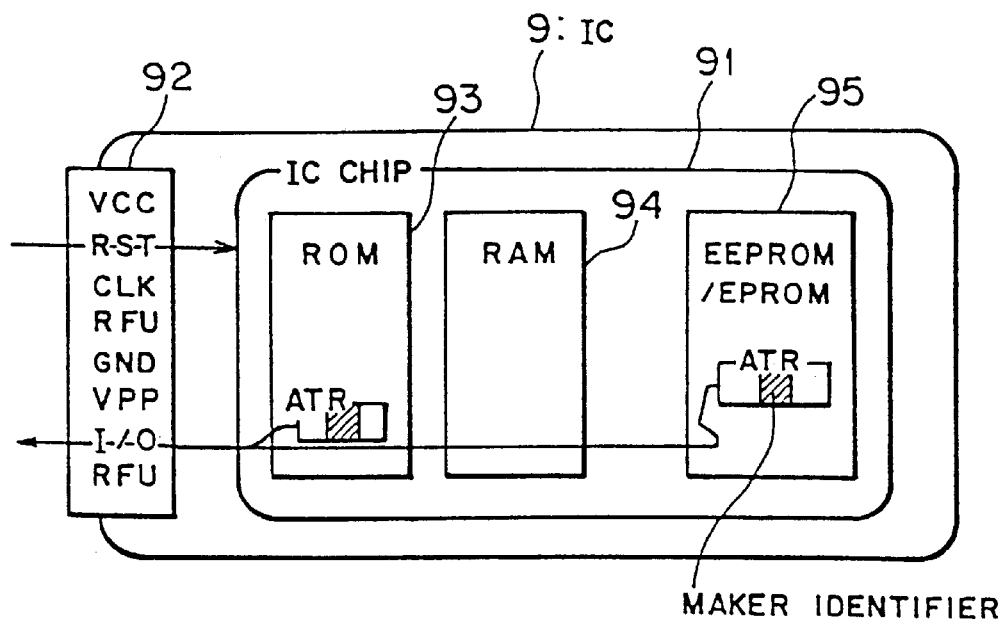
FIG. 9 is a block diagram showing another structure of the IC card according to the first embodiment.

The IC section (memory section) 9 can store various kinds of data information and control information for the IC card 4. For example, as shown in FIGS. 8 and 9, the IC section 9 is composed of an IC chip (memory section) 91 in which memories such as a ROM (Read Only Memory) section 93, a RAM (Random Access Memory) section 94, and an EEPROM (electrically erasable programmable read only memory) section [or EPROM (erasable programmable read only memory) section] 95 are integrated, and an interface section 92 for inputting data information to be stored in the IC chip 91 as well as outputting the data information stored in the IC chip 91. The interface section 92 also outputs the control information stored in the IC chip 91.

In the interface section 92, symbol VCC denotes a power supply terminal, symbol RST denotes a reset signal terminal used for hardware reset, symbol CLK denotes a clock terminal, symbol RFU denotes a spare terminal, symbol GND denotes a ground terminal, symbol VPP denotes a terminal for power supply used for writing data into the memories (RAM 94, EPROM 95), and symbol I/O denotes an input/output terminal.

When the IC card 4 having the above-described structure is inserted into the IC card R/W apparatus 5 or 6, the IC card 4 is generally subjected to hardware reset performed by the IC card R/W apparatus 5 or 6, and is then subjected to memory check. In response to the reset, the IC card 4 reports ATR information (answer-to-reset information: control information for response) to the outside apparatus (IC card R/W apparatus 5 or 6). The ATR information serves to report the card attributes of the IC card 4, such as a transmission protocol type and a transmission block size.

Accordingly, when a card maker identifier (card maker identification information) is set in the ATR information, which is reported to the outside as a response of the hardware reset, so as to report the card maker to the outside, it becomes possible for the outside apparatus to identify the maker of the IC card 4. However, in this case, the position of the card maker identifier included in the ATR information must be made identical among IC cards supplied by the same maker.

Therefore, in the IC card 4 according to the present embodiment, the ATR information (control information) including the card maker identifier (card maker identification information) is stored in the ROM section 93 or in the EEPROM section (or EPROM section) 95 of the IC chip 91 as shown in FIG. 8 or 9.

Upon entry of the IC card 4 into the IC card R/W apparatus 5 or 6, the maker of the inserted IC card 4 can be recognized from the card maker identifier included in the ATR information, which is reported to the outside as a response.

The ATR information may be stored in the ROM section 93 when the IC card 4 is manufactured, or may be set in EEPROM section (or EPROM section) 95 in advance. Alternatively, as shown in FIG. 9, for example, it is possible to store part of the ATR information containing the maker identifier in the EEPROM section (or EPROM section) 95 while storing the rest of the ATR information in the ROM 93. In this case, however, when the ATR information is reported (at the time of response), that part of the ATR information stored in the ROM 93 and the rest of the ATR information stored in the EEPROM/EPROM 95 must be combined.

The card maker identifier is not necessarily required to be included in the ATR information as described above. For example, the card maker identifier may be included in a command response signal, which is commonly exchanged by each of a plurality of IC cards 4. Alternatively, the card maker identifier may be included in separately prepared control information as to be reported to the outside so as to be set in the IC chip 91 in advance.

Figure 10:
FIG. 10 is a diagram showing an example of the format of a maker identifier request command used in the first embodiment.
Figure 11:
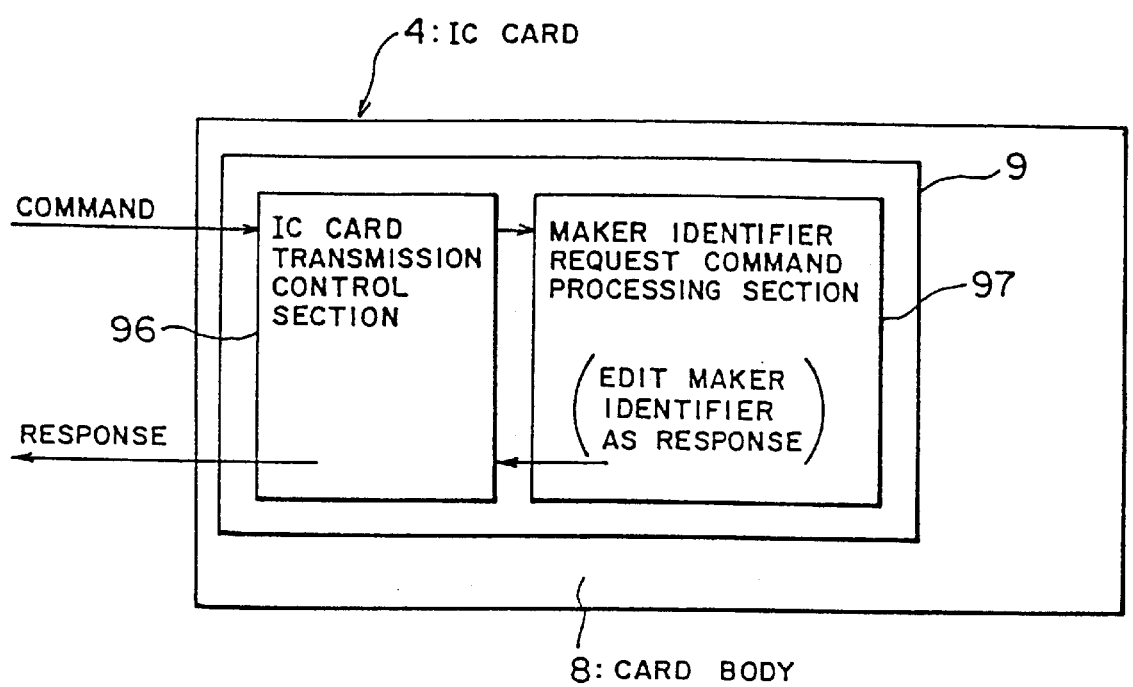
FIG. 11 is a block diagram showing another structure of the IC card according to the first embodiment.

In this case, a maker identifier request command, which has a format (consisting of a command class, a command code, etc.) as shown in FIG. 10, for example, must be prepared in the IC card R/W apparatus 5 (or 6), which will be described later. Moreover, as shown in FIG. 11, an IC card transmission control section 96, and a card maker identifier request command processing section 97 must be provided in the IC section 9 of the IC card 4. When a request command from the IC card R/W apparatus 5 (or 6) is received by the IC card transmission control section 96, the card maker identifier request command processing section 97 edits the control information including a previously set card maker identifier as a response, and the response is reported to the IC card R/W apparatus 5 (or 6) via the IC card transmission control section 96.

Figure 12:
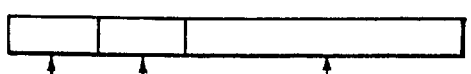
FIG. 12 is a diagram showing an example of the format of a read command used in the first embodiment.

The following method may also be employed. A read command, which has a format [consisting of a command class, a command code, and information for specifying data (a file name, a record number, etc.)] as shown in FIG. 12, for example, is commonly prepared for each IC card 4. At the stage when an IC card file format used in the system is determined, the card maker identifier is stored in a common record of the file as data. This makes it possible to report the maker identifier to the outside by reading out the data.

Figure 13:
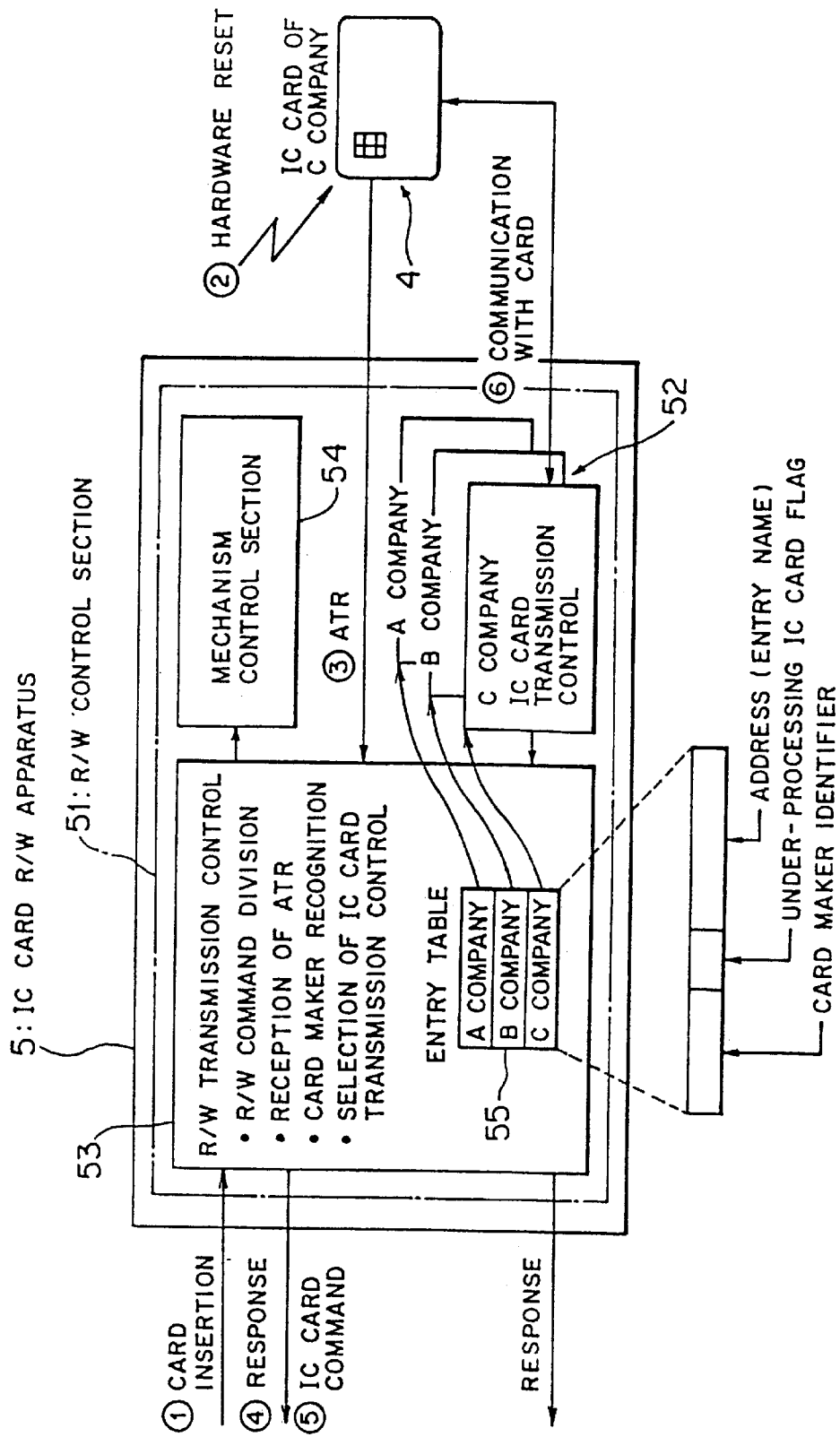
FIG. 13 is a block diagram showing a structure of an IC card R/W apparatus according to the first embodiment.

FIG. 13 is a block diagram showing a structure of the above-described IC card R/W apparatus 5. As shown in FIG. 13, the IC card R/W apparatus 5 includes an IC card reading/writing control section (R/W control section) 51 which controls reading/writing operation for the IC card 4. The R/W control section 51 includes a plurality of IC card transmission control sections 52 corresponding to a plurality of kinds of card makers such as, for example, A company, B company, C company . . . , a R/W transmission control section 53, and a mechanism control section 54.

When communication with the IC card 4 is performed, each IC card transmission control section 52 performs communication protocol conversion corresponding to the maker of the IC card 4 or other processes. The R/W transmission control section 53 totally controls transmission within the R/W control section 51. In the present embodiment, the R/W transmission control section 53 recognizes the card maker identifier in the ATR information reported by the IC card 4, and searches for the entries of the card maker previously registered (stored) in the entry table 55 based on the result of the recognition. Subsequently, the R/W transmission control section 53 selects and starts up an IC card transmission control section 52 corresponding to the searched-for card maker. Moreover, the R/W transmission control section 53 stores therein an R/W maker identifier (apparatus maker identification information) so as to report the maker of the IC card R/W apparatus 5 to the outside.

In the entry table 55, various kinds of information such as a card identifier, a flag representing an IC card under processing (under-processing IC card flag), and an address (entry name) are stored for each of a plurality of kinds of card makers. When the maker of the inserted IC card 4 is recognized in the above-described manner by the R/W transmission control section 53 based on the card maker identifier, the under-processing IC card flag for a corresponding card maker is set.

The mechanism control section 54 drives a motor or the like so as to take in or eject the IC card 4 in response to a command for taking in or ejecting the IC card 4, which is transmitted from the below described personal computer 7 via the R/W transmission control section 53.

That is, in order to control communication with a plurality of kinds of IC cards 4, the IC card R/W control section 51 of the IC card R/W apparatus 5 includes a plurality of IC card transmission control sections 52, and a selecting section (not illustrated) which receives the card maker identifier reported by the IC card 4 and selects an IC card transmission control section 52 corresponding to the IC card 4. The IC card R/W control section 51 further includes a storage section (not illustrated) for storing control information including an R/W maker identifier to be reported to a host such as the personal computer 7. In the present embodiment, the R/W control section 51 controls reading/writing operation for the IC card 4 based on the control information from the personal computer 7.

Figure 14:
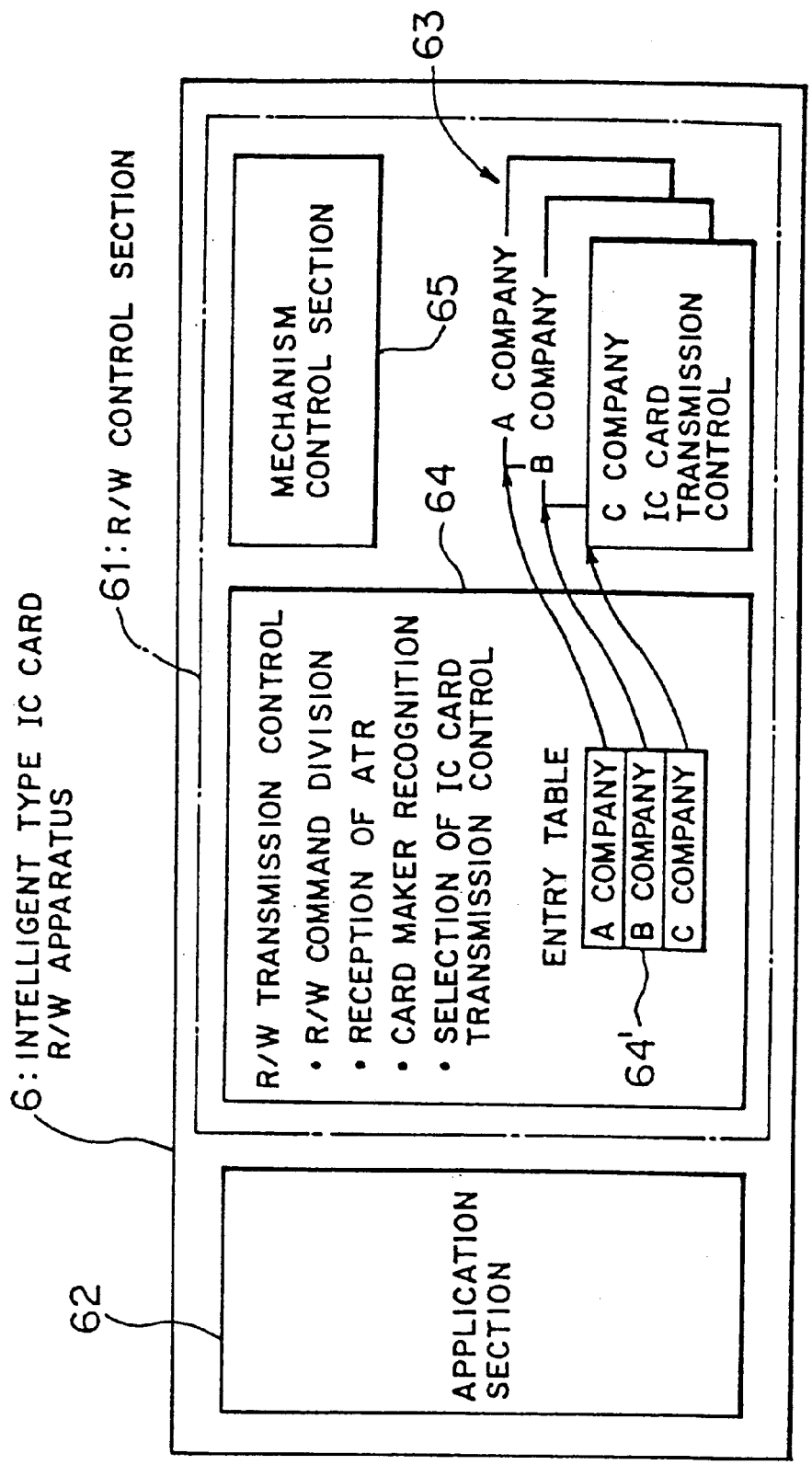
FIG. 14 is a block diagram showing a structure of an intelligent type IC card R/W apparatus according to the first embodiment.

FIG. 14 is a block diagram showing a structure of the intelligent type IC card R/W apparatus 6. Like the R/W control section 51, which has been described with reference to FIG. 13, the IC card R/W apparatus 6 is provided with an R/W control section 61 including a plurality of IC card transmission control sections 63 corresponding to a plurality of kinds of card makers, an R/W transmission control section 64, and a mechanism control section 65, as shown in FIG. 14. The R/W transmission control section 64 searches the entry table 64' in accordance with the card maker identifier in the received ATR information, and selects and starts up an IC card transmission control section 63 corresponding to the searched-for card maker. The mechanism control section 65 controls the operation for taking in and ejecting the IC card 4. In addition, the IC card R/W apparatus 6 includes an application section 62 which reports to the R/W control section 61 an instruction for inserting the IC card 4, an IC card command, or a like command.

That is, this intelligent type IC card R/W apparatus 6 receives neither an instruction for inserting the IC card 4 nor an IC card command from the personal computer 7, unlike the IC card R/W apparatus 5 shown in FIG. 13. Instead, the IC card R/W apparatus 6 receives the instruction and command from the application section 62 provided within the IC card R/W apparatus 6, so that the IC card R/W apparatus 6 can be controlled independently by the application section 62.

Figure 15:
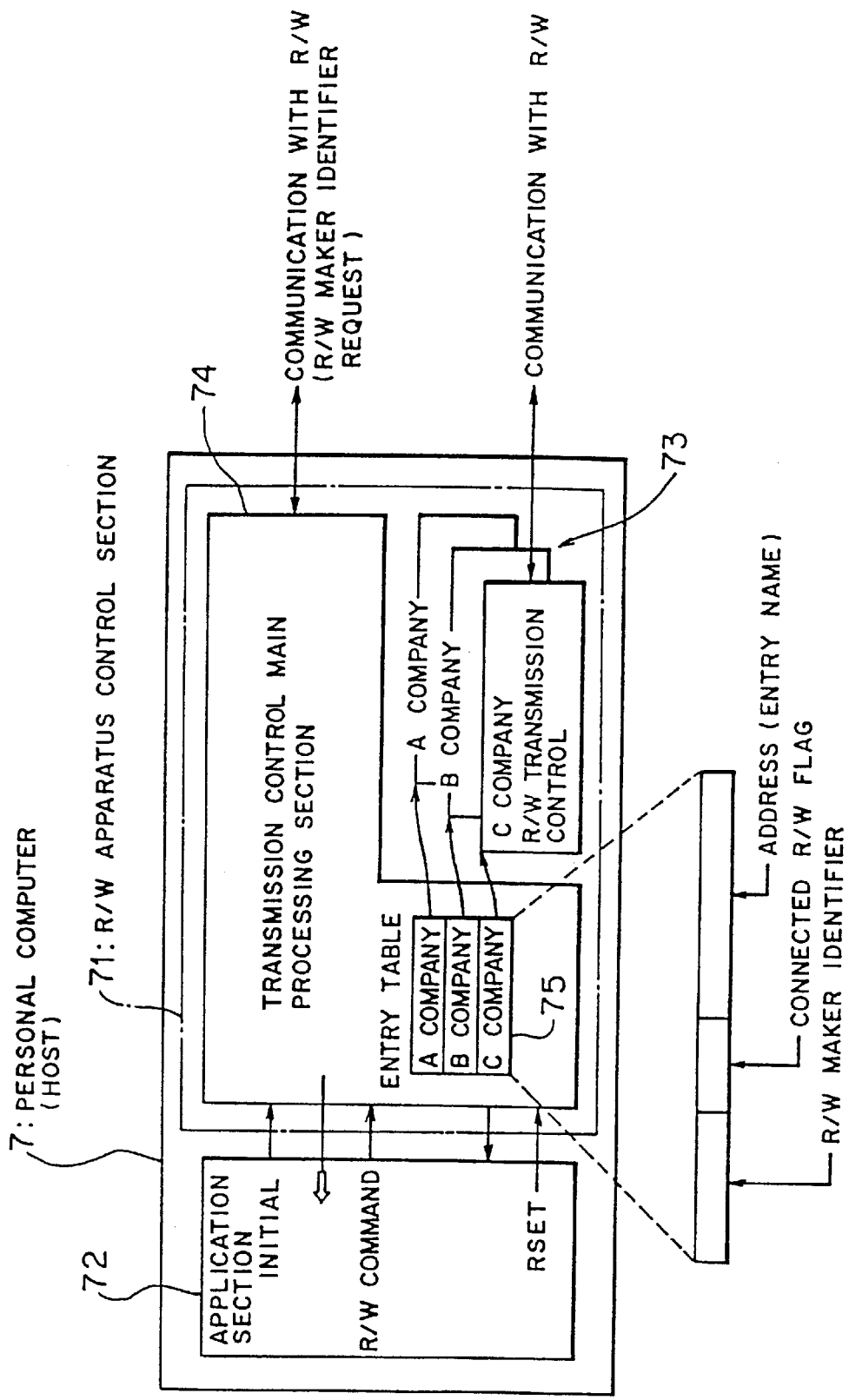
FIG. 15 is a block diagram showing a structure of a personal computer (host) according to the first embodiment.

FIG. 15 is a block diagram showing a structure of the above-described personal computer 7. As shown in FIG. 15, the personal computer 7 according to the present embodiment includes a reading/writing (R/W) apparatus control section 71 and an application section 72.

The R/W apparatus control section (IC card reading/writing apparatus control section) 71 controls the IC card R/W apparatus 5 (or 6). For example, the R/W apparatus control section 71 obtains an R/W maker identifier indicating the maker of the IC card R/W apparatus 5 (or 6), and recognizes the maker of the connected IC card R/W apparatus 5 (or 6) based on the obtained R/W maker identifier. Subsequently, the R/W apparatus control section 71 selects and starts up a corresponding R/W apparatus control section 73.

When control is handed over to the application section 72 after the personal computer 7 has been started up, the application section 72 transmits to the R/W apparatus control section 71 an initial processing command (INITIAL), an R/W command which instructs to start communication with the IC card R/W apparatus 5 (or 6), and a reset command (RSET) which instructs to stop the processing, so as to cause the R/W apparatus control section 71 to perform desired processing.

To this end, the R/W apparatus control section 71 is further provided with a plurality of R/W transmission control sections 73 corresponding to a plurality of kinds of card makers, and a transmission control main processing section 74 including an entry table 75 in which an R/W maker identifier, a connected R/W flag, an address (entry name), etc., are previously stored for each of the R/W apparatus control sections 73.

Each R/W apparatus control section (IC card reading/writing apparatus communication control section) 73 performs transmission protocol conversion suitable for the corresponding apparatus maker and other processes so as to actually control communication with the connected IC card R/W apparatus 5 (or 6).

Figure 16:
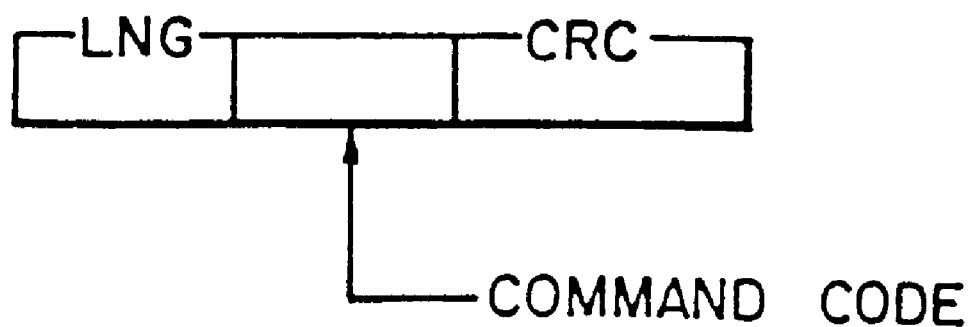
FIG. 16 is a diagram showing an example of the format of an R/W maker identifier request command used in the first embodiment.

The transmission control main processing section 74 totally controls a plurality of kinds of processing corresponding to various kinds of instructions from the application section 72. In the present embodiment, when an initial processing command (INITIAL) transmitted from the application section 72 after the start of the personal computer 7 is received, as described later, the transmission control main processing section 74 outputs to the IC card R/W apparatus 5 (or 6) an R/W maker identifier request command having a format as shown in FIG. 16, thereby obtaining an R/W maker identifier. Based on this R/W maker identifier, the transmission control main processing section 74 recognizes the maker (A company, B company, C company, . . .) of the connected IC card R/W apparatus 5 (or 6), and sets the connected R/W flag of a corresponding entry in the entry table 75 in accordance with the recognition result. Subsequently, the transmission control main processing section 74 selects and starts up an R/W apparatus control section 73 corresponding to the identified apparatus maker.

In other words, in order to control communication with a plurality of kinds of IC card R/W apparatus 5 (or 6), the R/W apparatus control section 71 of the above-described personal computer (host) 7 includes a plurality of R/W transmission control sections 73, and a selecting section (not illustrated) which receives the R/W maker identifier transferred from the IC card R/W apparatus 5 (or 6) and selects an R/W transmission control section 73 corresponding to the IC card R/W apparatus 5 (or 6).

Operation of the IC card system having the above-described structure will now described in further detail.

(1) Operation of the IC card R/W Apparatus 5

With reference to the flowchart (steps S1–S23) shown in FIG. 17, a description will be given of operation of the IC card R/W apparatus 5 for the case in which a card maker identifier is included in ATR information.

Figure 17:
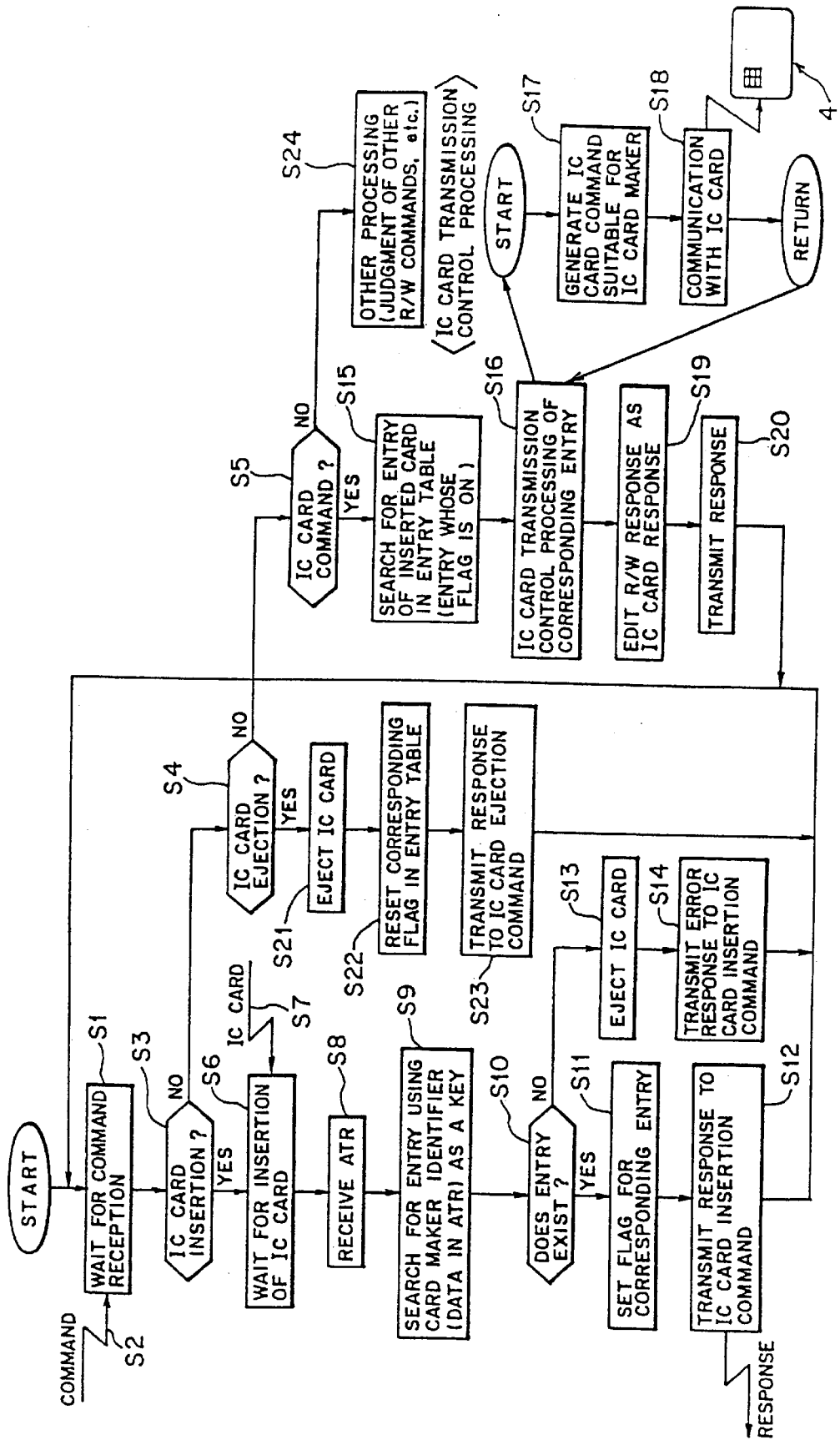
FIG. 17 is a flowchart showing operation of the IC card R/W apparatus according to the first embodiment.

As shown in FIG. 17, the IC card R/W apparatus 5 is initially in a state for waiting to receive a command from the host (personal computer 7) (step S1).

When any command is received from the personal computer 7, for example (step S2), the R/W transmission control section 53 of the IC card R/W apparatus 5 judges whether the received command is an IC card insertion (taking in) command, an IC card ejection command, or an IC card command (steps S3–S5).

When the received command is an IC card insertion command (when a judgement is "YES" in step S3), the IC card R/W apparatus 5 goes into a state for waiting for insertion of the IC card 4 (step S6). When the IC card 4 is inserted (step S7), hardware reset is performed for the IC card 4.

Subsequently, the IC card R/W apparatus 5 receives ATR information, which is transmitted from the IC card 4 as a response during the hardware reset (step S8), and searches the entry table 55 using as a key (or based on) the card maker identifier included in the ATR information so as to judge whether the corresponding card maker is registered in the entry table 55 (steps S9 and S10).

When the corresponding card maker is registered in the entry table 55 (when a judgement is "YES" in step S10), the R/W transmission control section 53 of the IC card R/W apparatus 5 sets the under-processing IC card flag of the corresponding entry (step S11), and a response to the received IC card insertion command is transmitted to the personal computer 7 (step S12). When the corresponding card maker is not registered in the entry table 55 (when a judgement is "NO" in step S10), in response to an instruction from the R/W transmission control section 53, the inserted IC card 4 is ejected by the mechanism control section 54 (step S13), and an error information (error response) indicating that the corresponding card maker is not registered is transmitted to the personal computer 7 as a response to the received IC card insertion command (step S14).

Subsequently, when the IC card R/W apparatus 5 receives an IC card command from the personal computer 7 (when a judgement is "NO" in each of steps S3 and S4, and a judgement is "YES" in step S5), the R/W transmission control section 53 of the IC card R/W apparatus 5 searches for an entry in the entry table 55 for which a flag has been set (step S15), and specifies the entry of the IC card 4 under processing (the card that has been inserted), and performs IC card transmission control processing corresponding to the IC card 4 (step S16).

That is, in the IC card R/W apparatus 5, the R/W transmission control section 53 selects and starts up an IC card transmission control section 52 corresponding to the inserted IC card 4, and performs communication protocol conversion corresponding to the inserted IC card 4 or performs a like process so as to generate an IC card command suitable for the IC card maker (step S17), and performs communication with the IC card 4 (reading out data from the IC card 4 and writing data into the IC card 4) (step S18).

When the communication with the IC card 4 is completed, the IC card R/W apparatus 5 edits and generates an R/W response so as to report, as a response (IC card response), that processing for the IC card command has been performed in a normal manner (step S19), and transmits it to the personal computer 7 (step S20).

Subsequently, when an IC card ejection command is received by the IC card R/W apparatus 5 (when a judgement is "NO" in step S3 and a judgement is "YES" in step S4), the R/W transmission control section 53 of the IC card R/W apparatus 5 instructs the mechanism control section 54 to eject the IC card 4 (step S21), and resets the under-processing IC card flag set in the entry table 55 (step S22). The R/W transmission control section 53 then transmits a response to the received IC card ejection command and goes into a state for waiting for a next command (step S23).

When the received command is neither an IC insertion command, an IC ejection command, nor an IC card command (when a judgement is "NO" in each of steps S3–S5), judgment processing and the like are performed for other R/W commands such as an R/W maker identifier request command from the personal computer 7, as will be described later (step S24).

As described above, in the IC card 4, ATR information (control information) including a card maker identifier to be reported to the outside is stored in the IC chip 91 (memory section: see FIG. 8). Therefore, the IC card 4 can report its card maker to the outside IC card R/W apparatus 5 using the card maker identifier, so that in the IC card R/W apparatus 5, the maker of the IC card 4 can be identified quite easily and processing corresponding to the card maker can be performed at all times. Accordingly, the IC card 4 can be procured from multiple vendors, thereby greatly decreasing costs involved in the procurement of the cards and apparatuses for the cards when the system is constructed.

The IC card R/W apparatus 5 receives the card maker identifier reported by the IC card 4, and selects one of the plurality of IC card control sections 52 so as to control communication with a plurality of kinds of IC cards 4. Therefore, reading/writing processing for the IC card 4 can always be performed in a normal manner, regardless of the maker of the IC card 4.

The command from the personal computer 7 serving as a host does not send a command to the intelligent type IC card R/W apparatus 6 so as to control communication with the IC card. Rather, the application section 62 sends a command to the intelligent type IC card R/W apparatus 6 so as to control communication with the IC card. As a result, the same processing as that described above is performed. Accordingly, when the system is constructed, the IC card R/W apparatuses 5 and 6 can be selected and used in accordance with necessity. This greatly contributes to flexibility in constructing the system.

(2) Modification of the Operation of the IC Card R/W Apparatus 5

Figure 18:
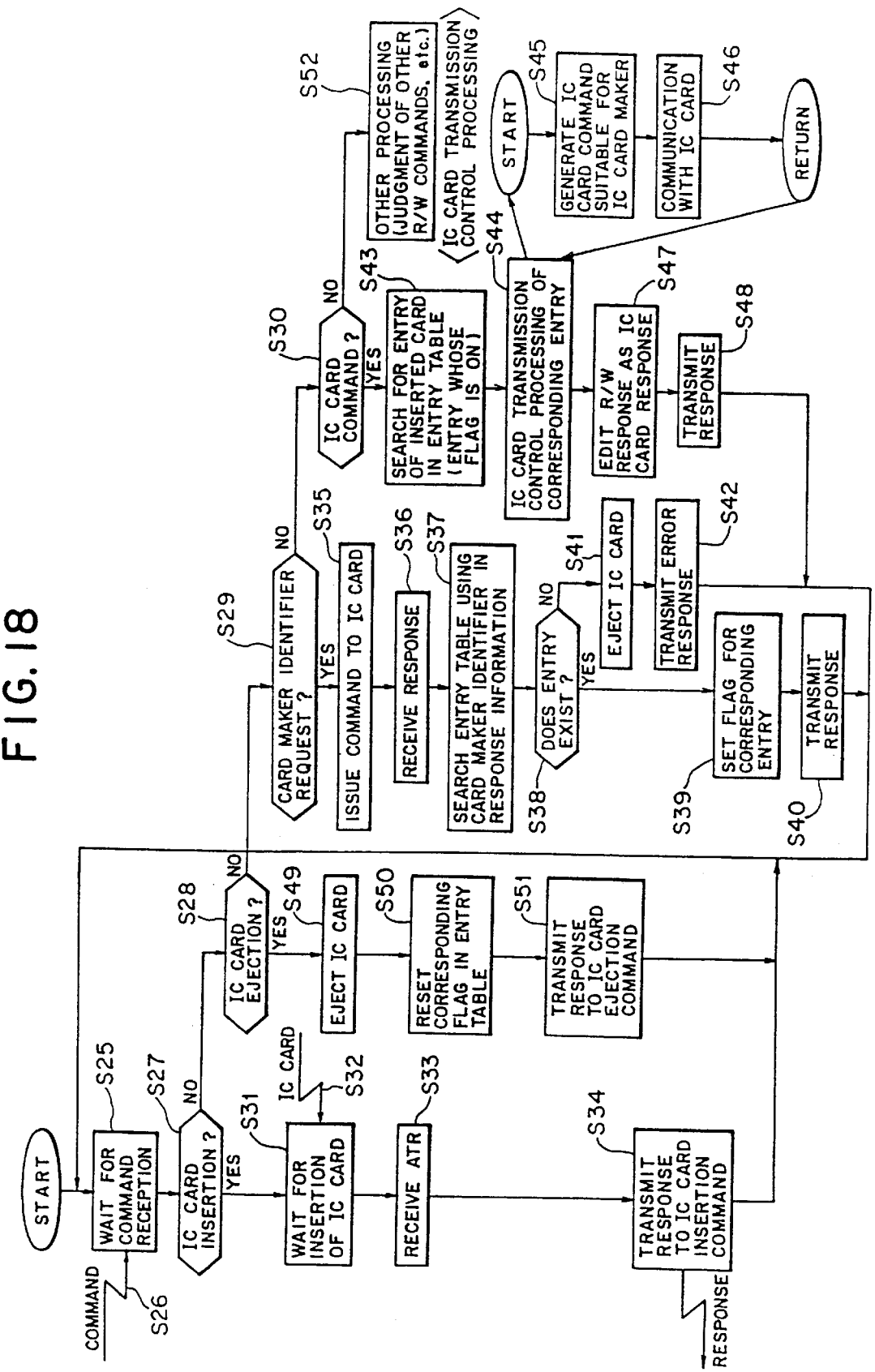
FIG. 18 is a flowchart showing a modification of the operation of the IC card R/W apparatus according to the first embodiment.

Next, with reference to the flowchart (steps S25–S52) shown in FIG. 18, a description will be given of the operation of the IC card R/W apparatus 5 for the case where a card maker identifier is included not in ATR information but in specific control information.

In this embodiment as well, when the IC card R/W apparatus 5 is in a state for waiting to receive a command (step S25) and a command is transmitted from a host such as the personal computer 7 (step S26), the command is received by the IC card R/W apparatus 5. Subsequently, the R/W transmission control section 53 judges whether the command is an IC card insertion command, an IC card ejection command, a card maker identifier request command, or an IC card command (steps S27–S30).

When the received command is an IC card insertion command (when a judgement is "YES" in step S27), the IC card R/W apparatus 5 goes into a state for waiting for insertion of the IC card 4 (step S31). When the IC card 4 is inserted (step S32), hardware reset is performed for the IC card 4. Subsequently, the IC card R/W apparatus 5 receives ATR information as a response to the hardware reset (step S33), and a response indicating that processing corresponding to the IC card command is performed in a normal manner is transmitted to the personal computer 7 (step S34).

After that, when the IC card R/W apparatus 5 receives a card maker identifier request command, for example, from the personal computer 7 (when a judgement is "NO" in each of steps S27 and S28, and a judgement is "YES" in step S29), the IC card R/W apparatus 5 issues a card maker identifier request command (read command) having a format shown in FIG. 10 (or FIG. 12) to the inserted IC card 4 (step S35).

In response to the request command, as has been described with reference to FIG. 11, the card maker identifier request command processing section 97 edits the control information including a previously set maker identifier as a response, and the response is reported to the IC card R/W apparatus 5 (or 6) via the IC card transmission control section 96. When the IC card R/W apparatus 5 receives the response (step S36), the IC card R/W apparatus 5 searches the entry table 55 using as a key the card maker identifier included in the response information (control information) (step S37), and judges whether the corresponding card maker is registered in the entry table 55 (step S38).

When the card maker corresponding to the received card maker identifier is registered in the entry table 55 (when a judgement is "YES" in step S38), the IC card R/W apparatus 5 sets an under-processing IC card flag for the corresponding entry within the entry table 55 (step S39), and a response indicating that processing for the card maker identifier request command has been performed in a normal manner is transmitted to the personal computer 7 (step S40). When the corresponding card maker is not registered in the entry table 55 (when a judgement is "NO" in step S38), the mechanism control section 54 is controlled by the R/W transmission control section 53 so as to eject the IC card 4 (step S41). Subsequently, an error message indicating that the corresponding card maker of the IC card 4 is not registered is transmitted to the personal computer 7 as an error response (step S42).

Subsequently, when the IC card R/W apparatus 5 receives an IC card command which instructs communication (reading/writing) with the IC card 4 (when a judgement is "NO" in each of steps S27–S29 and a judgement is "YES" in step S30), the R/W transmission control section 53 of the IC card R/W apparatus 5 searches for an entry in the entry table 55 for which a flag has been set (step S43), and specifies the entry of the IC card 4 under processing (the card that has been inserted), and performs IC card transmission control processing corresponding to the IC card 4 (step S44).

That is, in the IC card R/W apparatus 5, the R/W transmission control section 53 starts up an IC card transmission control section 52 corresponding to the inserted IC card 4, and performs communication protocol conversion corresponding to the inserted IC card 4 and other processes so as to generate an IC card command suitable for the IC card maker (step S45), and performs communication with the IC card 4 (reading out data from the IC card 4 or/and writing data into the IC card 4) (step S46).

When the communication with the IC card 4 is completed, the IC card R/W apparatus 5 edits and generates an R/W response so as to report, as a response to the IC card command (IC card response), that processing for the IC card command has been performed in a normal manner (step S47), and transmits it to the personal computer 7 (step S48).

Subsequently, when an IC card ejection command is received by the IC card R/W apparatus 5 (when a judgement is "NO" in step S27 and a judgement is "YES" in step S28), the R/W transmission control section 53 of the IC card R/W apparatus 5 controls the mechanism control section 54 to eject the IC card 4 (step S49), and resets the under-processing IC card flag set in the entry table 55 (step S50). The R/W transmission control section 53 then transmits to the personal computer 7 information, as a response, which indicates that the processing for the IC card ejection command has been performed normally, and goes into a state for waiting for a next command (step S51).

When the received command is neither an IC card insertion command, an IC card ejection command, a card maker identifier request command, nor an IC card command (when a judgement is "NO" in each of steps S27–S30), judgment processing and the like are performed for other R/W commands such as an R/W maker identifier request command from the personal computer 7, as will be described later (step S52).

As described above, in the IC card 4, specially provided control information including a card maker identifier to be reported to the outside is stored in the IC chip 91. Therefore, in response to the card maker identifier request command, the IC card 4 can report its card maker to the outside IC card R/W apparatus 5 using the card maker identifier, so that in the IC card R/W apparatus 5, the maker of the IC card 4 can be identified quite easily and processing corresponding to the card maker can be performed at all times. Accordingly, the IC card 4 can be procured from multiple vendors, thereby greatly decreasing costs involved in the procurement of the cards and apparatuses for the cards when the system is constructed.

In this case as well, the intelligent type IC card R/W apparatus 6 does not receive a command from the personal computer 7 serving as a host, but receives a command from the built-in application section 62 so as to perform same processing as that described above.

(3) Operation of the R/W Apparatus Control Section 71 of the personal computer 7

Figure 19:
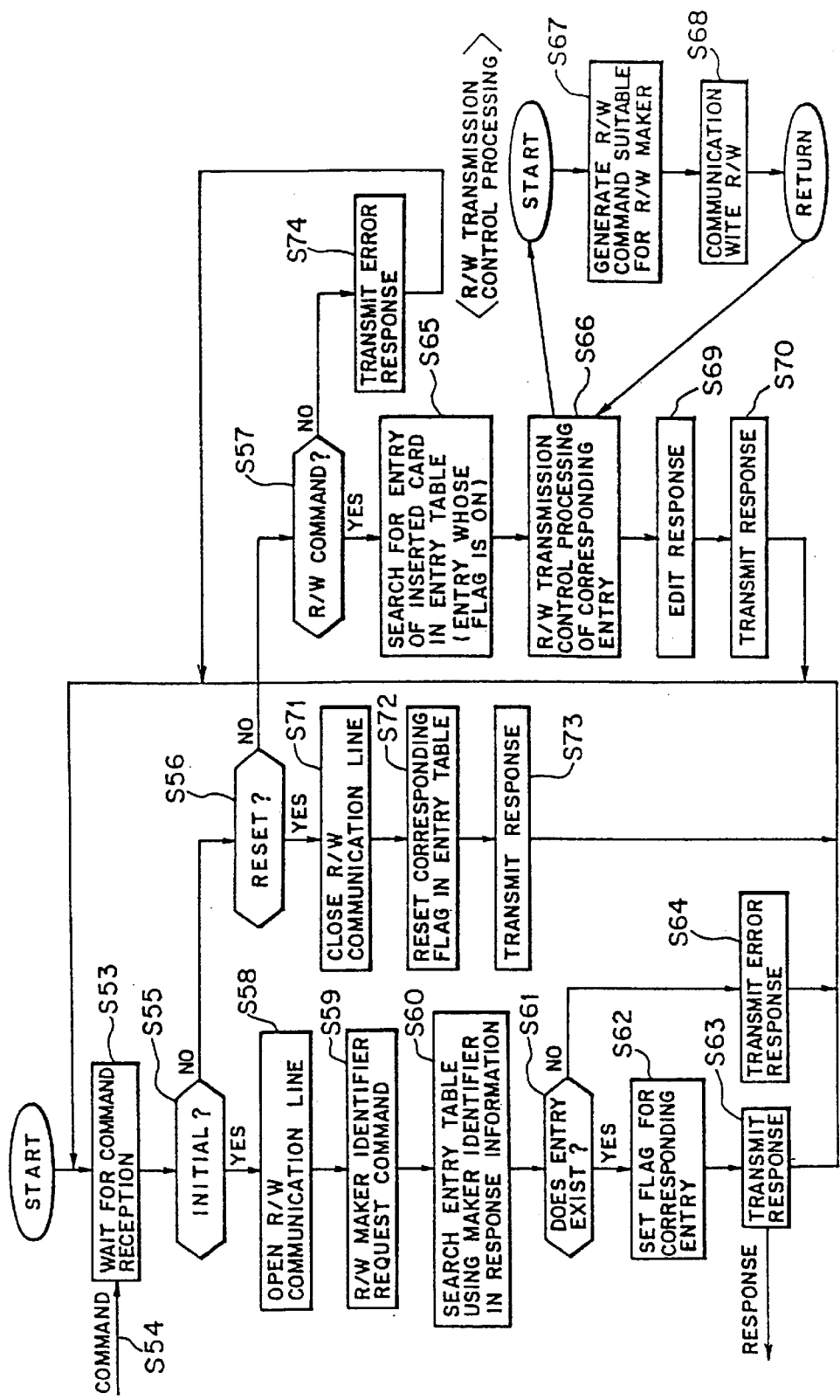
FIG. 19 is a flowchart showing operation of the R/W apparatus control section of the personal computer according to the first embodiment.

Next, operation of the R/W apparatus control section 71 of the personal computer 7 will be described with reference to the flowchart (steps S53–S74) shown in FIG. 19.

The R/W apparatus control section 71 of the personal computer 7 is initially in a state for waiting to receive a command (step S53). When any command is received from the application section 72 (step S54), the transmission control main processing section 74 judges whether the received command is an initial processing command (INITIAL), a reset command for instructing to end processing (RSET), or an R/W command for instructing to start communication with the IC card R/W apparatus 5 (steps S55–S57).

When the initial processing command (INITIAL) is received (when a judgement is "YES" in step S55), the R/W apparatus control section 71 first opens the communication line between the personal computer 7 and the IC card R/W apparatus 5 connected to the personal computer 7 (step S58). Subsequently, the transmission control main processing section 74 edits and generates an R/W maker identifier request command having a format as shown in FIG. 16, and transmits this command to the IC card R/W apparatus 5 (step S59).

After that, the R/W apparatus control section 71 recognizes the maker of the IC card R/W apparatus 5 connected to the personal computer 7 based on the R/W maker identifier, which is transmitted from the IC card R/W apparatus 5 as a response to the R/W maker identifier request command. The R/W apparatus control section 71 then searches the entry table 75 using as a key (or based on) the R/W maker identifier so as to judge whether the corresponding R/W maker is registered in the entry table 75 (steps S60 and S61).

When the corresponding R/W maker is registered in the entry table 75 (when a judgement is "YES" in step S61), the R/W apparatus control section 71 sets a connected R/W flag for that entry (step S62), and a response to the received start up command is transmitted to the application section 72 (step S63). Subsequently, the R/W apparatus control section 71 goes into a state for waiting for a next command.

When the corresponding R/W maker is not registered in the entry table 75 (when a judgement is "NO" in step S61), the fact that the corresponding R/W maker is not registered is transmitted to the personal computer 7 as an error response (step S64). Subsequently, the R/W apparatus control section 71 goes into a state for waiting for a next command.

When the transmission control main processing section 74 receives an R/W command from the application section 72 (when a judgement is "NO" in each of steps S55 and S56 and a judgement is "YES" in step S57), the transmission control main processing section 74 of the personal computer 7 searches for an entry in the entry table 75 for which a connected R/W flag has been set, and specifies the R/W maker (step S65). Subsequently, the transmission control main processing section 74 selects and starts up a corresponding R/W transmission control section 73 so as to carry out R/W transmission control processing (step S66).

That is, the R/W transmission control section 73 selected and started up by the transmission control main processing section 74 performs communication protocol conversion processing suitable for the maker of the connected IC card R/W apparatus 5 and the like so as to generate an R/W command (step S67), and performs communication with the IC card R/W apparatus 5 (step S68). When the communication between the R/W apparatus control section 71 and the IC card R/W apparatus 5 is completed, the R/W apparatus control section 71 edits and generates a response indicating that processing for the accepted R/W command has been performed in a normal manner (step S69), and transmits the response to the application section 72 (step S70). Subsequently, the R/W apparatus control section 71 goes into a state for waiting for a next command.

Moreover, when the transmission control main processing section 74 receives a reset command (RSET), which instructs to end the processing, from the application section 72 (when a judgement is "NO" in step S55 and a judgement is "YES" in step 56), the R/W apparatus control section 71 closes the communication line connected to the IC card R/W apparatus 5 (step S71), and resets the connected R/W flag set in the entry table 75 (step S72). Subsequently, the R/W apparatus control section 71 transmits to the application section 72 a response indicating that processing for the reset command (RSET) has been performed in a normal manner (step S73).

When the command received in step S54 is neither an initial processing command (INITIAL), a reset command (RSET), nor an R/W command (when a judgement is "NO" in each of steps S55–S57), the R/W apparatus control section 71 transmits an error response to the application section 72 and goes into a state for waiting for a next command (step S74).

As described above, in the personal computer 7, the R/W apparatus control section 71 selects one of the plurality of R/W transmission control sections 73 corresponding to the R/W maker identifier transferred from the IC card R/W apparatus 5 so as to control communication with a plurality of kinds of IC card R/W apparatuses 5. Accordingly, communication control can be performed in a normal manner at all times regardless of the maker of the connected IC card R/W apparatus 5.

Accordingly, when the system is constructed, IC card R/W apparatuses 5 can also be procured from multiple vendors, thereby greatly reducing the procurement cost.

As described above, the following operation is performed in the IC card system. In the IC card R/W apparatus 5, based on a card maker identifier reported by the IC card 4, a corresponding IC card transmission control section 52 is selected so as to control communication with the IC card 4. In the personal computer 7, based on an R/W maker identifier transferred from the IC card R/W apparatus 5, a corresponding R/W transmission control section 73 is selected so as to control communication with the IC card R/W apparatus 5. Therefore, in the IC card R/W apparatus 5, normal communication control can be performed regardless of the maker of the IC card 4. In the personal computer 7, normal communication control can be performed regardless of the maker of the IC card R/W apparatus 5 connected to the personal computer 7.

Accordingly, when the system is constructed, IC cards 4 and IC card R/W apparatuses 5 can also be procured from multiple vendors, thereby greatly reducing the procurement cost.

(c) Second Embodiment of the Invention

Figure 20:
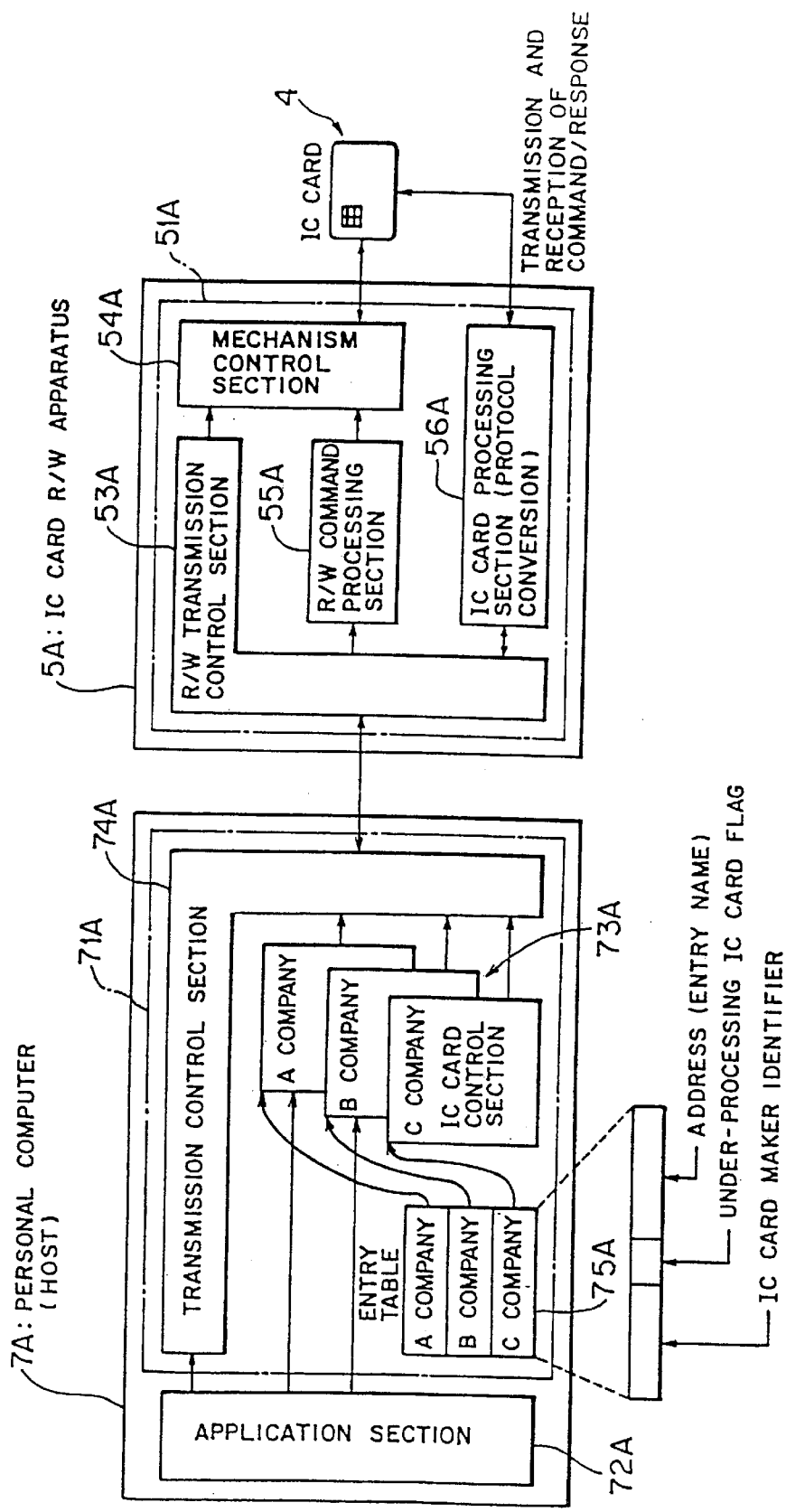
FIG. 20 is a block diagram showing an example of an IC card system according to a second embodiment of the present invention.

FIG. 20 is a block diagram showing an example of an IC card system according to a second embodiment of the present invention. In FIG. 20, numeral 4 denotes an IC card, numeral 5A denotes an IC card reading/writing (R/W)

apparatus, and numeral 7A denotes a personal computer. In the present embodiment, the IC card R/W apparatus 5A includes an R/W control section 51A which controls reading/writing operation for the IC card 4. This R/W control section 51A includes an R/W transmission control section 53A, a mechanism control section 54A, an R/W command processing section 55A, and an IC card processing section 56A.

The personal computer 7A includes an R/W apparatus control section 71A for performing control for the IC card R/W apparatus SA, and an application section 72A. The R/W apparatus control section 71A includes a plurality of IC card control sections 73A corresponding to a plurality of kinds of card makers, a transmission control section 74A, and an entry table 75A.

In the IC card R/W apparatus 5A, the R/W transmission control section 53A totally controls communication (transmission) with the IC card 4 and with the personal computer 7A, the mechanism control section 54A controls taking in and ejection of the IC card 4, and the R/W command processing section 55A carries out processing corresponding to an accepted R/W command (ejection of the IC card 4, etc.).

The IC card processing section (card maker identification information transfer section) 56A receives ATR information (card maker identifier), which is transmitted from the IC card 4, as a response, when the IC card 4 undergoes hardware reset, and transmits (transfers) the ATR information to the personal computer 7A. The IC card processing section 56A also performs communication protocol conversion and the like when communication (reading/writing) with the IC card 4 is actually performed.

In the personal computer 7A, each IC card control section (IC card communication control section) 73A controls communication with an IC card 4 of the corresponding maker, the transmission control section 74A totally controls communication (transmission) with the IC card R/W apparatus 5A. In the entry table 75A, information (a card maker identifier, an under-processing IC card flag, an address, etc.) is previously stored for each of the plurality of card makers. The entry table 75A functions as a selecting section which receives ATR information (card maker identifier) transmitted from the IC card R/W apparatus 5A, and selects and starts up an IC card control section 73A corresponding to the IC card 4.

Operation of the IC card system according to the present embodiment having the above-described structure will now described in detail with reference to the flowchart (steps S75–S96) shown in FIG. 21.

Figure 21:
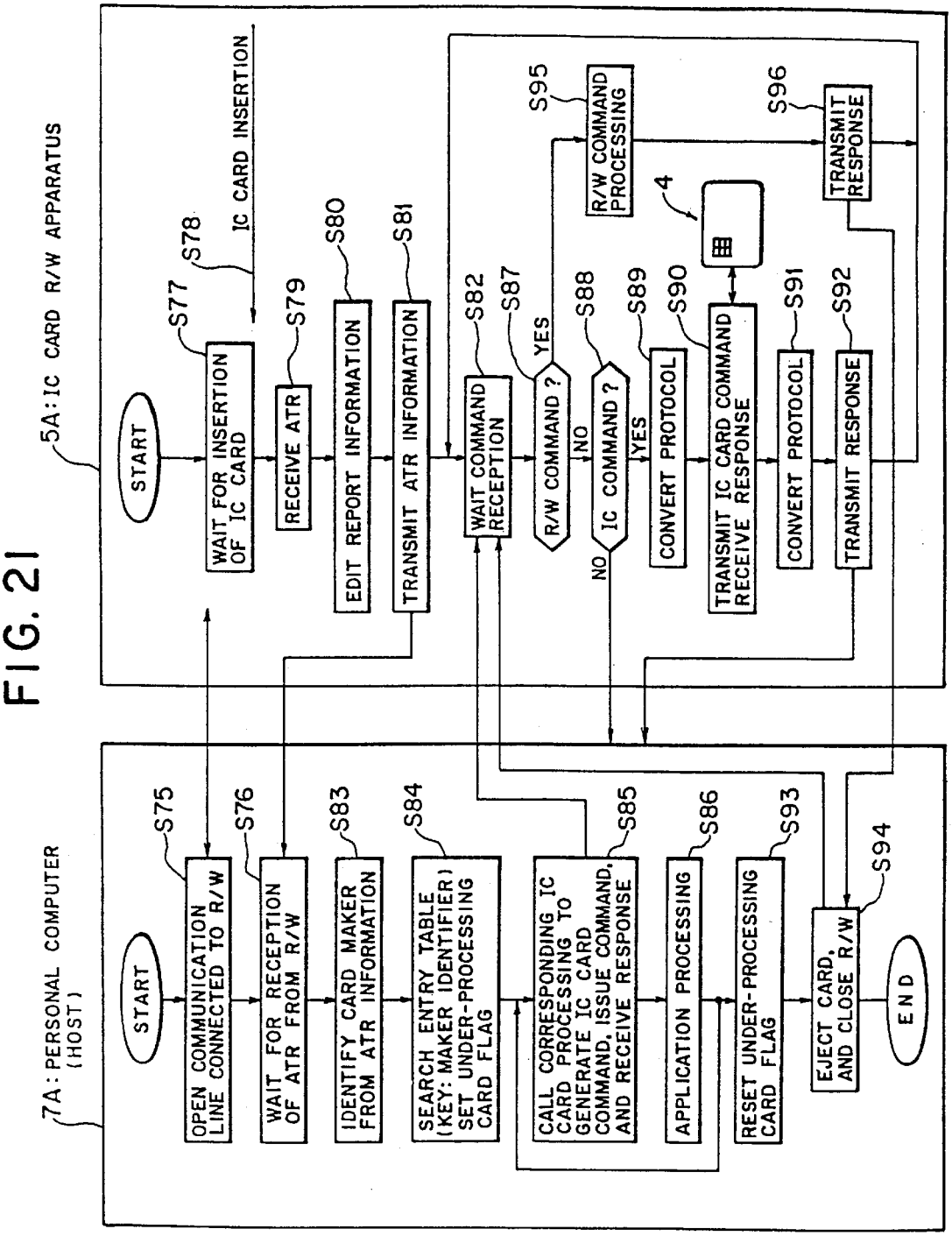
FIG. 21 is a flowchart showing operation of the IC card system according to the second embodiment.

As shown in FIG. 21, when the personal computer 7A and the IC card R/W apparatus 5A are connected with each other and the system is started, the personal computer 7A opens the communication line between the personal computer 7A and the IC card R/W apparatus 5A (step S75). Subsequently, the personal computer 7A goes into a state for waiting for ATR information transferred from the IC card R/W apparatus 5A (step S76).

At this time, the IC card R/W apparatus 5A is in a state for waiting for insertion of the IC card 4 (step S77). When the IC card 4 is inserted (step S78), the IC card R/W apparatus 5A performs hardware reset for the IC card 4, and receives ATR information as a response to the reset (step S79).

Subsequently, the IC card R/W apparatus 5A edits the information (card maker identifier), which is to be reported to the personal computer 7A, based on the received ATR information (step S80), and transmits the ATR information to the personal computer 7A (step S81). Subsequently, the personal computer 7A goes into a state for waiting to receive a command (step S82).

The personal computer 7A, which has received the ATR information, identifies the maker of the inserted IC card 4 based on the card maker identifier included in the ATR information (step S83), and searches the entry table 75A based on the identified card maker so as to set an under-processing IC card flag for the entry of the corresponding card maker (step S84).

Subsequently, the personal computer 7A selects and starts up an IC card control section 73A corresponding to the IC card 4, and generates an IC card command, which is then transmitted (issued) to the IC card R/W apparatus 5A (step S85). Until a response from the IC card R/W apparatus 5A is received, the application section 72A performs application processing (step S86).

When the IC card R/W apparatus 5A accepts the IC card command (when a judgement is "NO" in step S87 and a judgement is "YES" in step S88), the IC card processing section 56A of the IC card R/W apparatus 5A performs communication protocol conversion corresponding to the maker of the IC card 4. Subsequently, the IC card processing section 56A transmits an IC card command to the IC card 4 in accordance with the converted communication protocol, and receives a response thereto (steps S89 and S90).

The IC card R/W apparatus 5A converts the communication protocol to its original protocol (step S91), and transmits to the personal computer 7A a response indicating that the processing by the IC card command has been performed in a normal manner (step S92). When the personal computer 7A receives this response, the personal computer 7A resets the under-processing IC card flag which has been set in the entry table 75A and which corresponds to the maker of the IC card 4 (step 893). Subsequently, the personal computer 7A transmits a card ejection command (R/W command) to the IC card R/W apparatus 5A, and closes the communication line connected to the IC card R/W apparatus 5A (step S94).

The IC card R/W apparatus 5A, which has accepted the card ejection command, judges that this command is an R/W command (a judgment is "YES" in step S87), and causes the R/W command processing section 55A to control the mechanism control section 54A so as to eject the IC card 4 (step S95). The IC card R/W apparatus 5A then transmits to the personal computer 7A a response indicating that the processing for the accepted R/W command has been performed in a normal manner. Subsequently, the IC card R/W apparatus 5A goes into a state for waiting to receive a next command (step S96).

As described above, in the IC card R/W apparatus 5A, the R/W control section 51A receives the card maker identifier reported from the IC card 4 and transfers it to the personal computer 7A. Accordingly, the personal computer 7A can identify the maker of the IC card 4 at all times, which makes it possible to perform normal communication control regardless of the maker of the IC card 4.

Moreover, in the personal computer 7A, the R/W apparatus control section. 71A receives the card maker identifier transferred from the IC card R/W apparatus 5A, and selects one of the plurality of IC card control sections 73A corresponding to the IC card 4. This makes it possible to control communication with a plurality of IC cards of different makers in a normal manner at all times.

That is, in the above-described card system, a card maker identification information is previously stored in the IC card 4. Upon entry of the IC card 4 into the IC card R/W apparatus 5A, card maker identification information is reported from the IC card 4 to the IC card R/W apparatus 5A in response to a trigger signal (hardware reset signal) from the IC card R/W apparatus 5A. Subsequently, in the IC card R/W apparatus 5A, the card maker identification information reported by the IC card 4 is transferred to the personal computer 7A. In the personal computer 7A, based on the card maker identification information transferred from the IC card R/W apparatus 5A, an IC card control section 73A corresponding to the IC card 4 is selected so as to perform communication control with the IC card 4.

Accordingly, in the IC card system according to the present embodiment, communication control can be performed in a normal manner at all times regardless of the makers of the IC card 4 and the IC card R/W apparatus 5A connected to the personal computer 7A. In this case, the structure can be simplified by omitting the IC card control section 73A from the IC card R/W apparatus 5A. In addition, the IC card 4 and the IC card R/W apparatus 5A can be procured from multiple vendors. Accordingly, the procurement cost of equipment required to construct the system can be reduced.

(d) Third Embodiment of the Invention

Figure 22:
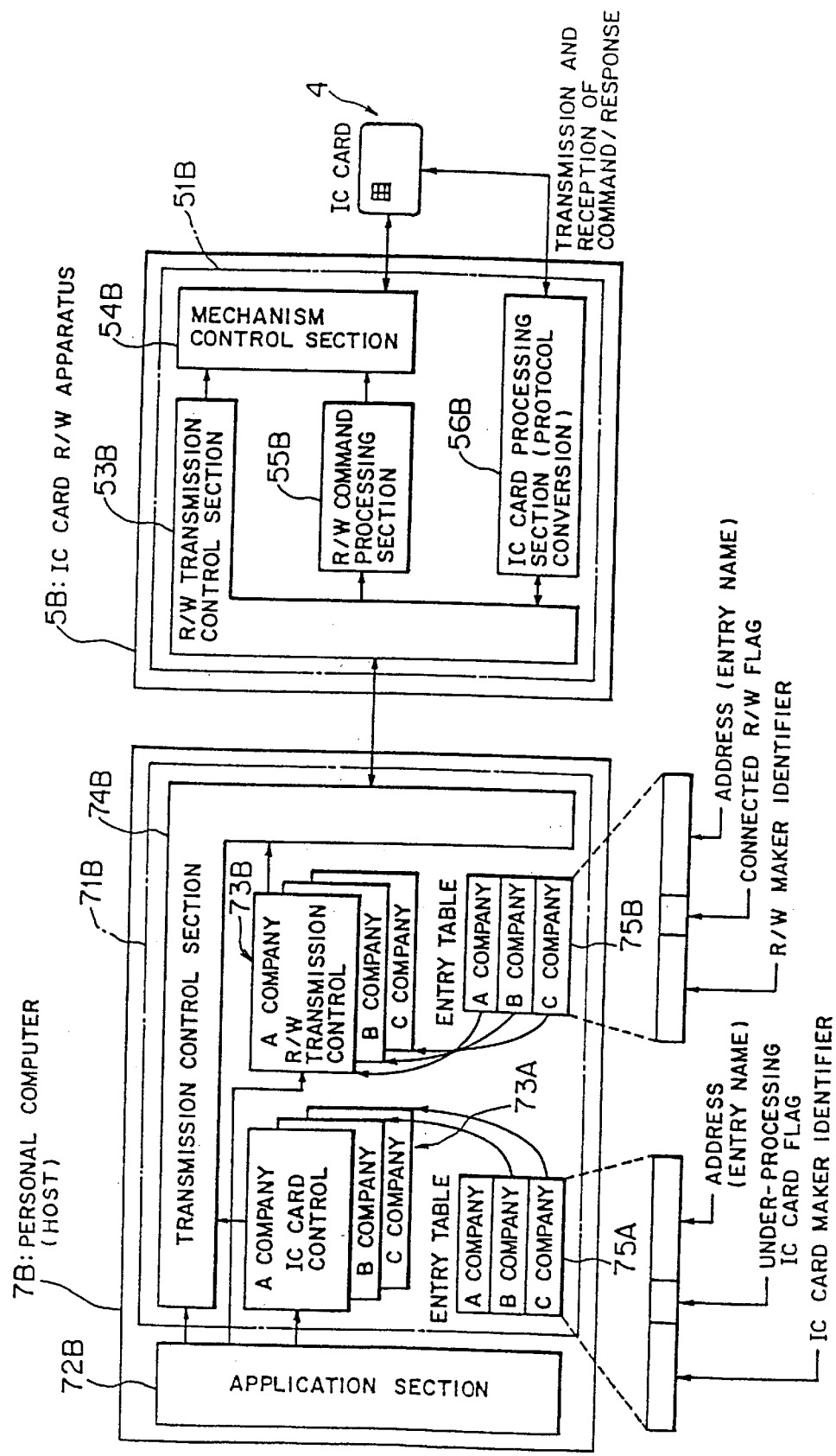
FIG. 22 is a block diagram showing an example of an IC card system according to a third embodiment of the present invention.

FIG. 22 is a block diagram showing an example of an IC card system according to a third embodiment of the present invention. In FIG. 22, numeral 4 denotes an IC card, numeral 5B denotes an IC card reading/writing (R/W) apparatus, and numeral 7B denotes a personal computer which is connected to the IC card R/W apparatus 5B as a host therefor.

Like the IC card R/W apparatus 5A described in the second embodiment, the IC card R/W apparatus 5B includes an R/W control section 51B which controls reading/writing operation for the IC card 4. This IC card R/W control section 51B includes an R/W transmission control section 53B, a mechanism control section 54B, an R/W command processing section 55B, and an IC card processing section 56B.

The R/W transmission control section 53B totally controls communication (transmission) with the IC card 4 and the personal computer 7B, the mechanism control section 54B controls taking in and ejection of the IC card 4, and the R/W command processing section 55B carries out processing corresponding to an accepted R/W command (ejection of the IC card 4, etc.).

The IC card processing section (a storage section, a card maker identification information transfer section) 56B receives ATR information (card maker identifier), which is transmitted from the IC card 4, as a response, when the IC card 4 undergoes hardware reset, and transmits the ATR information to the personal computer 7B together with an R/W maker identifier which is held in the IC card processing section 56B and used for identifying the maker of the IC card R/W apparatus 5B. The IC card processing section 56B also performs communication protocol conversion and the like when communication (reading/writing) with the IC card 4 is actually performed.

That is, in the IC card R/W apparatus 5B, the IC card R/W control section 51B stores control information including the R/W maker identifier (apparatus maker identification information) to be reported to the personal computer 7B, and receives the card maker identifier reported by the IC card 4 so as to transfer it to the personal computer 7B.

Meanwhile, as shown in FIG. 22, the personal computer 7B includes an IC card R/W apparatus control section 71B for performing control for the IC card R/W apparatus 5B, and an application section 72B. The IC card R/W apparatus control section 71B includes a plurality of IC card control sections 73A corresponding to a plurality of kinds of card makers, a plurality of R/W transmission control sections 73B corresponding to a plurality of kinds of apparatus makers, a transmission control section 74B, and entry tables 75A and 75B.

Each IC card control section (IC card communication control section) 73A controls communication with an IC card 4 of the corresponding card maker, the R/W transmission control section (IC card reading/writing apparatus communication control section) 73B controls communication with an IC card R1W apparatus 5B of the corresponding apparatus maker, the transmission control section 74B totally controls communication (transmission) with the IC card R/W apparatus 5B.

In the entry table 75A, information (a card maker identifier, an under-processing IC card flag, an address, etc.) is previously stored for each of the plurality of kinds of card makers. The entry table 75A functions as a second selecting section which receives ATR information (card maker identifier) transferred from the IC card R/W apparatus 5B, and selects and starts up an IC card control section 73A corresponding to the IC card 4. In the entry table 75B, information (an R/W maker identifier, a connected R/W flag, an address, etc.) is previously stored for each of the plurality of kinds of apparatus makers. The entry table 75B functions as a first selecting section which receives an R/W maker identifier reported by the IC card R/W apparatus 5B together with ATR information, and selects and starts up an R/W transmission control section 73B corresponding to the connected IC card R/W apparatus 5B.

In other words, in order to control communication with a plurality of kinds of IC card R/W apparatuses 5B, the personal computer 7B of the present embodiment includes a plurality of R/W transmission control sections 73B, and a first selecting section which receives an R/W maker identifier transferred from the IC card R/W apparatus 5B and selects an R/W transmission control section 73B corresponding to the IC card R/W apparatus 5B. Moreover, a plurality of IC card control sections 73A and a second selecting section is added to the R/W apparatus control section 71B. The second control section receives a card maker identifier included in ATR information transferred from the IC card R/W apparatus 5B and selects an IC card control section 73A corresponding to the IC card 4.

Operation of the IC card system according to the present embodiment having the above-described structure will now described in detail with reference to the flowchart (steps S97–S118) shown in FIG. 23.

When the personal computer 7B and the IC card R/W apparatus 5B are connected with each other and the system is started, the personal computer 7B opens the communication line between the personal computer 7B and the IC card R/W apparatus 5B (step S97). Subsequently, the personal computer 7B goes into a state for waiting for report information, which will be described later, transmitted from the IC card R/W apparatus 5B (step S98). At this time, the IC card R/W apparatus 5B is in a state for waiting for insertion of the IC card 4 (step S99). When the IC card 4 is inserted (step S100), the IC card R/W apparatus 5B performs hardware reset for the IC card 4. As result, ATR information including the card maker identifier is transmitted as a response from the IC card 4, together with the R/W maker identifier of the IC card R/W apparatus 5B (step S101).

When the IC card R/W apparatus 5B receives the ATR information (card maker identifier) and the R/W maker identifier (step S102), the IC card R/W apparatus 5B edits the control information (card maker identifier, IC card R/W maker identifier) which is to be reported to the personal computer 7B (step S103), and transmits the control information to the personal computer 7B (step S104). Subsequently, the personal computer 7B goes into a state for waiting to receive a command (step S105).

The personal computer 7B, which has received the reported information, searches the entry tables 75A and 75B using the card maker identifier and the R/W maker identifier included in the reported information, and sets an under-processing flag in the corresponding entry tables 75A and 75B (step S106). Subsequently, the personal computer 7B calls (selects and starts up) a corresponding IC card control section 73A and/or a corresponding R/W transmission control section 73B, and generates an R/W command or IC card command, which is then issued to the IC card R/W apparatus 5B (step S107). Until a response from the IC card R/W apparatus 5B is received, the application section 72 performs application processing (step S108).

When the IC card R/W apparatus 5B, which has been brought into a command waiting state in step S105, accepts a command issued in step S107, the IC card R/W apparatus 5B judges whether the accepted command is an R/W command which instructs ejection of the card or the like (step S109). When it is judged that the accepted command is not an R/W command (when a judgement is "NO" in step S109), it is further judged whether the command is an IC card command (step S110).

When it is judged that the accepted command is an IC card command (when a judgement is "YES" in step S110), the IC card R/W apparatus 5B causes the IC card processing section 56B to perform communication protocol conversion corresponding to the maker of the IC card 4. Subsequently, the IC card processing section 56B transmits an IC card command to the IC card 4 in accordance with the converted communication protocol, and receives a response thereto (step S112).

The IC card R/W apparatus 5B then converts the communication protocol to its original protocol (step S113), and transmits to the personal computer 7B a response indicating that the processing by the IC card command has been performed in a normal manner (step S114). When the personal computer 7B receives this response, the personal computer 7B resets the under-processing card flag which has been set in the entry table 75A and which corresponds to the maker of the inserted IC card 4 and also resets the under-processing card flag which has been set in the entry table 75B and which corresponds to the maker of the connected IC card R/W apparatus 5B (step S115). Subsequently, the personal computer 7B transmits a card ejection command (R/W command) to the IC card R/W apparatus 5B, and closes the communication line connected to the IC card R/W apparatus 5B (step S116).

The IC card R/W apparatus 5B, which has accepted the card ejection command, judges that this command is an R/W command (a judgement is "YES" in step S109), and causes the R/W command processing section 55B to control the mechanism control section 54B so as to eject the IC card 4 (perform R/W command processing) (step S117). The IC card R/W apparatus 5B then transmits to the personal computer 7B a response indicating that the processing for the accepted R/W command has been performed in a normal manner. Subsequently, the IC card R/W apparatus 5B goes into a state for waiting to receive a next command (step S118).

As described above, in the IC card 4, ATR information (control information) including a card maker identifier to be reported to the outside is stored in the IC chip 91 (memory section: see FIG. 8). Therefore, the IC card 4 can report its card maker to the outside using the card maker identifier, so that in the outside apparatus (IC card R/W apparatus 5B), the maker of the IC card 4 can be identified quite easily and processing corresponding to the card maker can be performed at all times.

In the IC card R/W apparatus 5B, the R/W control section 51B reports control information including the R/W maker identifier to the personal computer 7B, and also transfers the card maker identifier reported by the IC card 4 to the personal computer 7B. Accordingly, the personal computer 7B can identify both the maker of the IC card R/W apparatus 5B and the maker of the IC card 4 at all times, which makes it possible to perform normal communication control regardless of the makers of the IC card R/W apparatus and the IC card.

Moreover, in the personal computer 7B, the R/W apparatus control section 71B receives the R/W maker identifier transferred from the IC card R/W apparatus 5B, and selects an R/W apparatus transmission control section 73B corresponding to the IC card R/W apparatus. This makes it possible to control communication with a plurality of kinds of IC card R/W apparatuses 5B. The R/W apparatus control section 71B also receives the card maker identifier transferred from the IC card R/W apparatus 5B, and selects an IC card control section 73A corresponding to the IC card 4. This makes it possible to control communication with a plurality of kinds of IC cards. Accordingly, communication with the IC card 4 and the IC card R/W apparatus 5B can be controlled in a normal manner regardless of the makers of the IC card 4 and the IC card R/W apparatus 5B connected to the personal computer 7B.

That is, in the IC card system of the present embodiment, an R/W maker identifier is previously included in the IC card R/W apparatus 5B. When the communication line is connected between the IC card R/W apparatus 5B and the personal computer 7B, an R/W maker identifier is reported from the IC card R/W apparatus 5B to the personal computer 7B. Subsequently, in the personal computer 7B, based on the R/W maker identifier transferred from the IC card R/W apparatus 5B, an IC card R/W transmission control section 73B corresponding to the IC card R/W apparatus 5B so as to control communication with the IC card R/W apparatus 5B. Moreover, a card maker identifier is previously stored in the IC card 4. Upon entry (insertion) of the IC card 4 into the IC card R/W apparatus 5B, card maker identifier is reported from the IC card 4 to the IC card R/W apparatus 5B in response to a trigger signal (hardware reset signal) from the IC card R/W apparatus 5B. Subsequently, in the IC card R/W apparatus 5B, the card maker identifier reported by the IC card 4 is transferred to the personal computer 7B. In the personal computer 7B, based on the card maker identifier transferred from the IC card R/W apparatus 5B, an IC card control section 73A corresponding to the IC card 4 is selected so as to control communication with the IC card 4.

Accordingly, the personal computer 7B can carry out communication control in a normal manner at all times regardless of the makers of the IC card R/W apparatus 5B and the IC card 4. In this case as well, the IC card 4 and the IC card R/W apparatus 5B can be procured from multiple vendors. Accordingly, the procurement cost of equipment required to construct the system can be reduced.

What is claimed is:

1. An IC card reading/writing apparatus having an IC card reading/writing control section, which controls the reading and/or writing of data from and/or into an IC card, said IC card reading/writing control section comprising:

a storage section storing control information, which includes apparatus maker identification information identifying the apparatus maker of the IC card reading/writing apparatus itself for notification to a host computer outside of said IC card reading/writing apparatus to cause the host computer to designate a protocol corresponding to the apparatus maker identified by the apparatus maker identification information; and a card maker identification information transfer section receiving card maker identification information identifying an IC card manufacturer itself and contained in an answer-to-reset signal from a given IC card, and transferring the received card maker identification information from the given IC card to the host computer to cause the host computer to designate a protocol that is adapted to a direct communication between the given IC card and the host computer via said IC card reading/writing apparatus, and corresponding to the IC card manufacturer identified by the transferred card maker identification information.

2. The IC card reading/writing apparatus according to claim 1, wherein said IC card reading/writing control section receives from the host computer, control information used to control the reading and/or writing of data from and/or into the IC card.

3. The IC card reading/writing apparatus according to claim 1, wherein said IC card reading/writing control section further comprises:

an application section used to control the reading and/or writing of data from and/or into the IC card.

* * * * *